(12) United States Patent
Fazel Sarjoui et al.

(10) Patent No.: US 10,887,796 B2
(45) Date of Patent: Jan. 5, 2021

(54) METHODS AND APPARATUS TO ENABLE MULTI-AP WLAN WITH A LIMITED NUMBER OF QUEUES

(71) Applicant: Intel Corporation, Santa Clara, CA (US)

(72) Inventors: Fatemeh Fazel Sarjoui, Hillsboro, OR (US); Maria Ramirez Loaiza, Beaverton, OR (US); Vijay Sarathi Kesavan, Portland, OR (US); William R. Dieter, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 73 days.

(21) Appl. No.: 16/224,691

(22) Filed: Dec. 18, 2018

(65) Prior Publication Data

US 2020/0196192 A1    Jun. 18, 2020

(51) Int. Cl.
| | |
|---|---|
| *H04W 28/08* | (2009.01) |
| *H04W 28/12* | (2009.01) |
| *H04W 4/80* | (2018.01) |
| *H04W 28/02* | (2009.01) |
| *G06N 20/00* | (2019.01) |
| *H04W 84/12* | (2009.01) |

(52) U.S. Cl.
CPC .......... *H04W 28/08* (2013.01); *H04W 4/80* (2018.02); *H04W 28/0252* (2013.01); *H04W 28/12* (2013.01); *G06N 20/00* (2019.01); *H04W 84/12* (2013.01)

(58) Field of Classification Search
CPC ... H04W 28/08; H04W 4/80; H04W 28/0252; H04W 28/12; H04W 84/12; G06N 20/00
See application file for complete search history.

(56) References Cited

U.S. PATENT DOCUMENTS

| | | | | |
|---|---|---|---|---|
| 7,453,804 B1* | 11/2008 | Feroz | .................... | H04L 43/026 370/230 |
| 7,761,875 B2* | 7/2010 | Karamanolis | ............. | G06F 9/50 370/235 |

(Continued)

OTHER PUBLICATIONS

Jain et al., "A Quantitative Measure of Fairness and Discrimination for Resource Allocation in Shared Computer System," Technical Report DEC-TR-301, Sep. 26, 1984, 38 pages.

(Continued)

*Primary Examiner* — Pao Sinkantarakorn
*Assistant Examiner* — Kabir U Jahangir
(74) *Attorney, Agent, or Firm* — Hanley, Flight & Zimmerman, LLC

(57) ABSTRACT

Methods, apparatus, systems and articles of manufacture are disclosed provide an apparatus to allocate bandwidth between devices, the apparatus comprising a comparator to determine whether a first dataflow to a first device is below a first fair share throughput attributed to the first device; and a weight adjustor to, in response to the comparator determining that the first dataflow is below the first fair share throughput attributed to the first device adjust the first fair share throughput such that the first dataflow is closer to the first fair share throughput; and adjust a second fair share throughput attributed to a second device such that a second dataflow to the second device is closer to the second fair share throughput.

20 Claims, 9 Drawing Sheets

(56) References Cited

U.S. PATENT DOCUMENTS

| | | | |
|---|---|---|---|
| 8,208,406 B1* | 6/2012 | Jiang | H04L 47/623 370/255 |
| 2004/0136379 A1* | 7/2004 | Liao | H04L 47/2458 370/395.21 |
| 2006/0280119 A1* | 12/2006 | Karamanolis | G06F 9/5038 370/229 |
| 2006/0294044 A1* | 12/2006 | Karlsson | G06Q 10/06 |
| 2015/0163148 A1* | 6/2015 | Harmatos | H04L 47/6215 370/235 |
| 2017/0055012 A1* | 2/2017 | Phillips | H04L 67/06 |
| 2018/0014050 A1* | 1/2018 | Phillips | H04N 21/23605 |

OTHER PUBLICATIONS

Floyd, S., "Congestion Control Principles," Internet RFC 2914 (Best Current Practice), Sep. 2000, 17 pages, retrieved from https://tools.ietf.org/html/rfc2914.

Demers et al., "Analysis and Simulation of a Fair Queueing Algorithm," ACM SIGCOMM Computer Communication Review, 1989, 14 pages.

\* cited by examiner

000
METHODS AND APPARATUS TO ENABLE MULTI-AP WLAN WITH A LIMITED NUMBER OF QUEUES

FIELD OF THE DISCLOSURE

This disclosure relates generally to communication between access points, and, more particularly, to methods and apparatus to enable multi-AP WLAN with a limited number of queues.

BACKGROUND

Many locations provide Wi-Fi connectivity to connect Wi-Fi enabled devices to networks such as the Internet. Wi-Fi enabled devices include personal computers, videogame consoles, mobile phones and devices, tablets, smart televisions, digital audio player, etc. Wi-Fi allows Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the signal range of the access point (e.g., an access point device, a gateway, a hot spot, a modem, etc.). A Wi-Fi access point periodically sends out a beacon frame, which contains information that allows Wi-Fi enabled devices to identify, connect to, and transfer data to the access point.

Wi-Fi is implemented using a set of media access control (MAC) and physical layer (PHY) specifications (e.g., the Institute of Electrical and Electronics Engineers (IEEE) 802.11 protocol). Devices (e.g., access points and Wi-Fi enabled devices) able to operate using IEEE 802.11 protocol are referred to as stations (STA) (e.g., station device).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
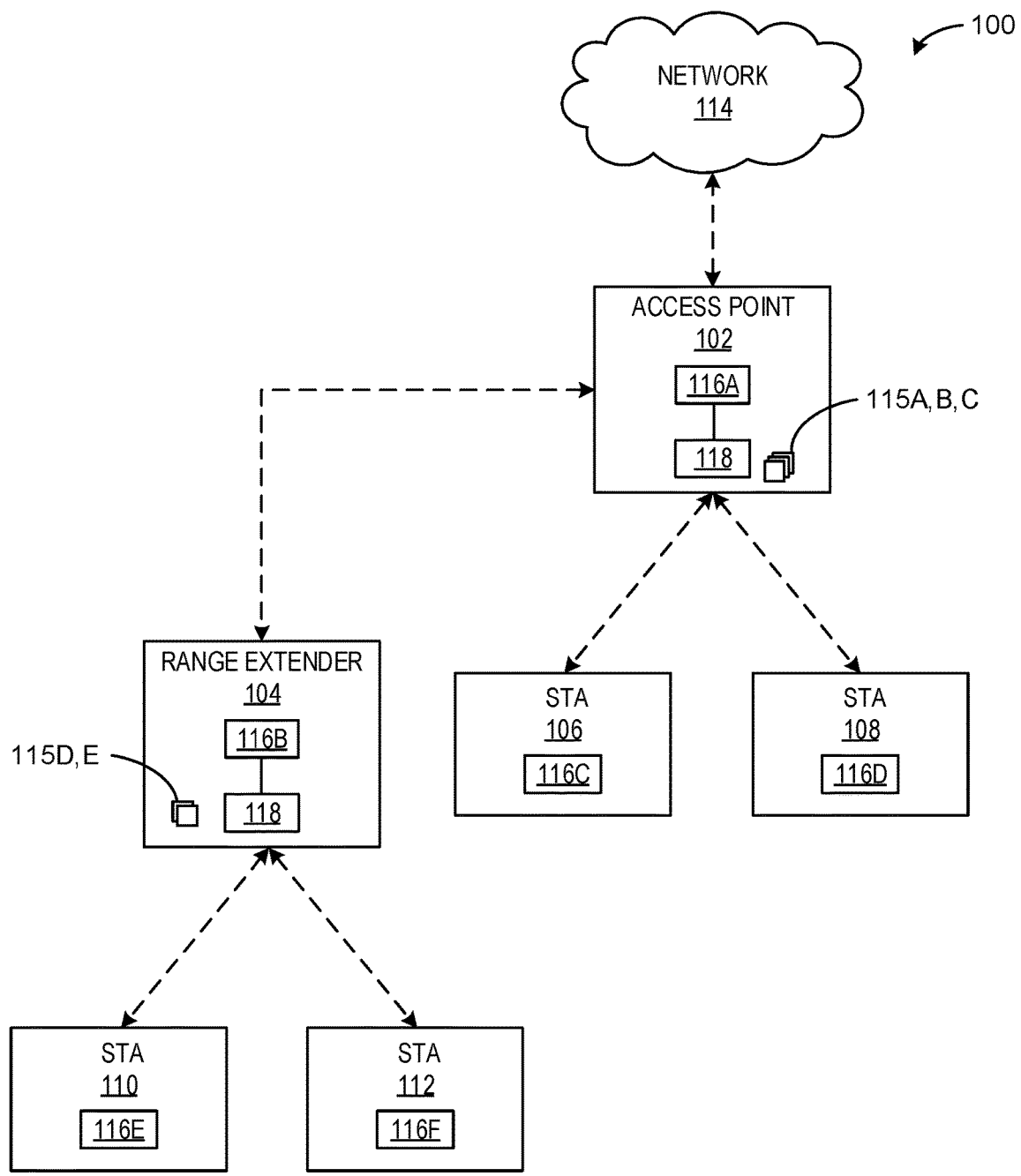
FIG. 1 is an illustration of communications using WLAN Wi-Fi protocols to facilitate wireless connectivity including a range extender between access points and devices.

Various locations (e.g., homes, offices, coffee shops, restaurants, parks, airports, etc.) may provide Wi-Fi to the Wi-Fi enabled devices (e.g., STAs) to connect the Wi-Fi enabled devices to the Internet, or any other network, with minimal hassle. The locations may provide one or more Wi-Fi access points (APs) to output Wi-Fi signals to the Wi-Fi enabled devices within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol for how the AP communicates with the devices to provide access to the Internet by transmitting uplink (UL) transmissions and receiving downlink (DL) transmissions to/from the Internet. Wi-Fi protocols describe a variety of management frames (e.g., beacon frames and trigger frames) that facilitate the communication between access points and stations.

In an AP, hardware may impose a limit on the number of available queues. A queue is a data structure in an AP that contains a sequence of data packets addressed to different STAs in the network. In a queue, data is added to the queue and removed from the queue in a first in, first out (FIFO) order. Depending on the AP in a use-case, the number of queues available to transmit data packets to STAs varies.

As the network size grows the limitation on the number of queues inevitably results in allocating queues on a "collective" basis rather than on a per-destination or per-client basis. For example, in multi-AP networks, the platform at a root AP may allocate one (or a few) queue(s) for each satellite AP/range extender that is connected to the AP, utilizing a weighted fair queueing (WFQ) scheme or other fair queueing mechanisms applied among these queues.

In a WFQ scheme, a fair share throughput is assigned to each of the STAs or REs connected to an AP. Fair share throughput is defined as the lesser of the throughput demanded by a STA connected to an AP, or an equal share of the available throughput on each of the APs within a multi-AP network. WFQ essentially weights each queue according to an analyzed number of STAs being serviced by the queue.

For example, in a multi-AP network, a root AP services, two range extenders (e.g., satellite APs) and two STAs. In the example, the first range extender services two STAs and the second range extender services three STAs. In some WFQ schemes, the root AP weights each of the two range extenders and the two STAs with a 0.25 weight, thus allocating 25% of the bandwidth of the root AP to each of the STAs and the range extenders. Additionally, the first range extender weights each of the two STAs with a 0.5 weight, thus allocating 12.5% of the bandwidth of the root AP to each of the STAs. Furthermore, the second range extenders weights each of the two STAs with a 0.33 weight, thus allocating 8.33% of the bandwidth of the root AP to each of the STAs.

Other WFQ schemes determine the number of devices being serviced by each of the queues of the root AP, as well as the queues of the range extenders. In such other examples, the root AP weights each of the two STAs with a 0.143 weight, thus allocating 14.3% of the bandwidth of the root AP to each of the two STAs. Additionally, the root AP weights the first range extender with a 0.286 weight, effectively allocating 14.3% of the bandwidth of the root AP to each of the two STAs serviced by the first range extender. Furthermore, the root AP weight the second range extender with a 0.429 weight, effectively allocating 14.3% of the bandwidth of the root AP to each of the three STAs serviced by the second range extender.

Regardless of any particular WFQ scheme, the objective of fair queueing is to ensure all clients (e.g., STAs) receive "fair service" regardless of which AP (root AP or satellite APs) they are connected to. Service is fair when each STA or RE (e.g., satellite AP) receives its fair share of available airtime (e.g., time during which a broadcast is being transmitted) and as much throughput as it needs for all its traffic such that the dataflow (e.g., throughput the STA or RE actually receives) of the STA or RE is at or below the fair share throughput of the STA or RE (e.g., the amount of bandwidth allocated to a STA or RE). Dataflow is the amount of data that is being drawn by a client in a network (e.g., a STA, a RE, etc.). Fair share throughput is the amount of bandwidth that is allocated to a client in a network by an AP. Multi-AP scenarios present a new use-case that is not addressed by traditional queueing methods. Devices connected to APs have a demand for dataflow. For example, a STA streaming 4K media can stream smoothly with a dataflow greater than or equal to 100 MB/s. However, when a STA streaming 4K video is connected to the same AP as a STA sending text messages, both the STA streaming 4K video and the STA sending text messages are each assigned a fair share throughput of ½ of the bandwidth of the AP. The example AP has a bandwidth of 100 MB/s, so the STA streaming 4K video has a demand for a higher dataflow. Specifically, the STA streaming 4K video has a demand for a dataflow greater than or equal to 50 MB/s. Because the STA streaming 4K video has a higher demand for dataflow but is only allocated a fair share throughput of ½ the bandwidth of the AP, the STA streaming 4K video cannot smoothly stream the 4K video. Thus, the Quality of Service (QoS) of the STA streaming 4K video is below that of the STA sending text messages.

When the number of queues is limited, an awareness of user demands is required so that the per-queue weights in WFQ can be set accordingly to ensure service fairness among clients. Traditional methods of WFQ do not account for the demand of each of the STAs connected to either a root AP or satellite APs (e.g., range extenders).

Learning user demand and activity pattern is a challenging task, especially because user's demand depends on the underlying application being utilized on the STA. A typical home WLAN network generally carries a dynamic traffic pattern with users transitioning from idle to active, stopping and starting different traffic streams and new clients joining the network. Furthermore, traffic demands across network devices may vary significantly, from high-demand video conferencing and 4K video streaming to short infrequent transmissions by IoT devices.

Example methods of enabling service fairness disclosed herein include a dynamic method that adapts to demands of clients by observing network traffic without any prior knowledge of traffic type and user demand. Additionally, this method relies on adopting a fairness metric. As described below Jain's Fairness Index is the assumed fairness metric, though other fairness metrics could be used. In case of Jain's Fairness Index, fairness is achieved when Jain index is 1.

In some examples, the method can use machine learning algorithms (e.g., Reinforcement Learning (RL) among other possible algorithms). As an example implementation of the proposed algorithm, below, an example Reinforcement Learning-based approach is presented.

FIG. 1 illustrates an example communication system 100 using wireless local area network Wi-Fi protocols to facilitate wireless connectivity between an example access point (AP) 102, an example range extender (RE) 104, and example STAs 106 and 108. The example of FIG. 1 further includes example STAs 110, 112, and an example network 114.

The example AP 102 includes the example radio architecture 116A and the example bandwidth analyzer 118. The example RE 104 includes the example radio architecture 116B and the example bandwidth analyzer 118. The example STA 106 includes the example radio architecture 116C and the example STA 108 include the example radio architecture 116D. The example STA 110 includes the example radio architecture 116E and the example STA 112 includes the example radio architecture 116F. In the example, the AP 102 communicates with (e.g., services) the RE 104 via the radio architecture 116A and includes a first queue 115A including communications for the RE 104. The AP 102 communicates with (e.g., services) the STA 106 via the radio architecture 116A and includes a second queue 115B including communications for the STA 106. The AP 102 communicates with (e.g., services) the STA 108 via the radio architecture 116A and includes a third queue 115C including communications for the STA 108. The example RE 104 communicates with (e.g., services) the STA 110 via the radio architecture 116B and includes a fourth queue 115D including communications for the STA 110. The RE 104 communicates with (e.g., services) the STA 112 via the radio architecture 116B and includes a fifth queue 115E including communication for the STA 112. Additionally, in some examples of the AP 102, the RE 104, and the STAs 106, 108, 110, 112, the example radio architectures 116 A,B,C,D may be physically similar but can, in some examples, operate on different (e.g., separate) transmission and/or reception frequencies.

The example AP 102 of FIG. 1 is a device that generates a wireless network (e.g., a WLAN, at WPAM, a WWAN, etc.) in an environment (e.g., a home, an office, a coffee shop, etc.). In the example, the AP 102 is a router that allows the RE 104 and the example STAs 106, 108 to access wirelessly the example network 114. In other examples, the AP 102 is a combination of a modem and a router, a network switch, an ethernet hub, or any other device that provides a wireless connection from the RE 104 and the STAs 106, 108 to the network 114. In the example, the AP 102 is a router, and the AP 102 accesses the network 114 through a wire connection via a modem. In some examples, the AP 102 is a STA that is in communication with the RE 104 and the STAs 106, 108.

The example AP 102 includes three queues, one of which services the RE 104, one of which services the STA 106, and one or which services the STA 108. Data packets in each of the queues are addressed to the RE 104, the STA 106, and the STA 108 individually according to the first queue 115A, the second queue 115B, and the third queue 115C, respectively. The data packets that are transmitted the RE 104 via the radio architecture 116A are received by the radio architecture 116B. The data packets transmitted to the RE 104 are a first dataflow. The data packets that are transmitter to the STA 106 via the radio architecture 116A are received by the radio architecture 116C. The data packets transmitted to the STA 106 are a second dataflow. The data packets that are transmitter to the STA 108 via the radio architecture 116A are received by the radio architecture 116D. The data packets transmitted to the STA 108 are a third dataflow.

The example RE 104 includes two queues one of which services the STA 110, and one of which services the STA 112. Data packets in each of the queues are addressed the STA 110, and the STA 112 individually according to the fourth queue 115D and the fifth queue 115E, respectively. The data packets that are transmitted to the STA 110 via the radio architecture 116B are received by the radio architecture 116E. The data packets transmitted to the STA 110 are a fourth dataflow. The data packets that are transmitter to the STA 112 via the radio architecture 116B are received by the radio architecture 116F. The data packets transmitted to the STA 112 are a fifth dataflow.

The example radio architecture 116A of the AP 102 corresponds to components used to wirelessly transmit and/or receive data, as further described below in conjunction with the examples shown in FIG. 5. Additionally, the example AP 102 may include an application processor (e.g., the example application processor 510 of FIG. 5) to generate instructions related to other Wi-Fi protocols.

The example RE 104 is a device that extends the network coverage of the AP 102. In the example, the RE 104 is a range extender and the RE 104 allows the example STAs 110, 112 to access wirelessly the example network 114 via the example AP 102. In other examples, the RE 104 may be a router, a modem-router, and/or any other device that provides a wireless connection from the network 114 via the example AP 102 to the STAs 110, 112. In the example, the RE 104 is a range extender and the RE 104 accesses the network 114 via a wireless connection to the AP 102. If the RE 104 is implemented utilizing is a router, the router accesses the network 114 through a wire connection to the AP 102. In some examples, the RE 104 is a STA that is in communication with the AP 102 and the STAs 110, 112.

The example radio architecture 116B of the RE 104 corresponds to components used to wirelessly transmit and/or receive data, as further described below in conjunction with the examples shown in FIG. 5. Additionally, the example RE 104 may include an application processor (e.g., the example application processor 510 of FIG. 5) to generate instructions related to other Wi-Fi protocols.

The example STAs 106, 108 of FIG. 1 are Wi-Fi enabled devices that access the network 114 with the AP 102 during a service period (SP). The example STAs 106, 108 may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device.

The example AP 102 includes the example bandwidth analyzer 118 to determine whether a weight associated with a fair share throughput of each of the RE 104 and the STAs 106, 108 allows for an optimized fairness for each of the RE 104 and the STAs 106, 108.

The example RE 104 includes the example bandwidth analyzer 118 to determine whether a weight associated with a fair share throughput of each of the STA 110 and the STA 112 allows for an optimized fairness for each of the STA 110 and the STA 112.

The example network 114 of FIG. 1 is a system of interconnected systems exchanging data. The example network 114 may be implemented using any type of public or private network such as, but not limited to, the Internet, a telephone network, a local area network (LAN), a cable network, and/or a wireless network. To enable communication via the network 114, the example AP 102 includes a communication interface that enables a connection to an Ethernet, a digital subscriber line (DSL), a telephone line, a coaxial cable, or any wireless connection, etc. In some examples, the example network 114 provides the requested data to be organized into data packets. To enable connection to the AP 102, the RE 104 includes a communication interface (e.g., the radio architecture 116B) that enables a connection the AP 102. In some example, the communication interface is wired (e.g., an Ethernet connection). In other example the communication interface is wireless (e.g., WLAN, cellular network, etc.).

The example bandwidth analyzer 118 is a device that allocates bandwidth between STAs (e.g., allocates bandwidth between devices) communicating with an AP (e.g., the AP 102, the RE 104, etc.). When the dataflow to one or more of the RE 104, the STA 106, the STA 108, STA 110, and the STA 112 is below the fair share throughput, the example bandwidth analyzer 118 adjusts the weight associated with the fair share throughput of each of the RE 104, the STA 106, the STA 108, the STA 110, and the STA 112 to optimize the fairness of the network. Additionally, the bandwidth analyzer 118, further described in conjunction with FIG. 2, after receiving instructions from the application processor 510 of FIG. 5, sets the fair share throughputs for the RE 104, the STA 106, the STA 108, the STA 110, and the STA 112. The bandwidth analyzer 118 determines the dataflow associated with each of the RE 104, the STA 106, the STA 108, the STA 110, and the STA 112. The bandwidth analyzer 118 determines the dataflow by determining the number of data packets and size of each data packet sent to each of the RE 104 and the STAs 106, 108 over a specified period of time. For example, the bandwidth analyzer 118 determines that five data packets are sent to the STA 106 over a period of five seconds (s), each data packet containing 15 megabytes (MB). In the example, the bandwidth analyzer 118 determines the second dataflow to the STA 106 is 15 MB/s.

Additionally, the bandwidth analyzer 1118 determines whether the dataflow associated with one or more of the RE 104, STA 106, STA 108, STA 110, or the STA 112 is below the fair share throughput for the RE 104, STA 106, STA 108, STA 110, and the STA 112, respectively. In response to determining that one or more of the dataflows associated with the RE 104, STA 106, STA 108, STA 110, or the STA 112 is below the fair share throughput for the RE 104, STA 106, STA 108, STA 110, and the STA 112, respectively, the bandwidth analyzer 118 calculates a fairness for each of the RE 104, the STA 106, the STA 108, the STA 110, and the STA 112. In the example, the bandwidth analyzer 118 calculates the fairness based on the dataflow for each of the RE 104, the STA 106, the STA 108, the STA 110, and the STA 112 and the present value for the fair share throughput of the RE 104, the STA 106, the STA 108, the STA 110, and the STA 112. In this manner, a low fairness is associated with one of the RE 104, the STA 106, the STA 108, the STA 110, and the STA 112 that has a dataflow that is below the fair share throughput for the one of the RE 104, the STA 106, the STA 108, the STA 110, and the STA 112. Additionally, a high fairness is associated with one of the RE 104, the STA 106, the STA 108, the STA 110, and the STA 112 that has a dataflow that is closer to the fair share throughput for the one of the RE 104, the STA 106, the STA 108, the STA 110, and the STA 112.

The bandwidth analyzer 118 determines whether the fair share throughputs of one or more of the RE 104, the STA 106, the STA 108, the STA 110, or the STA 112 has improved as compared to the previous fair share throughputs of one or more of the RE 104, the STA 106, the STA 108, the STA 110, or the STA 112. In this manner, the bandwidth analyzer 118 accesses the previous values of the fair share throughput. For example, the bandwidth analyzer 118 calculates a fairness index of the ones of the AP 102 and the RE 104 according to the present values of the fair share throughputs and the previous values of the fair share throughputs. If the fairness index for the ones of the AP 102 and the RE 104 has increased, the fair share throughput comparator 204 determines that the fair share throughput of one or more of the RE 104, the STA 106, the STA 108, the STA 110, or the STA 112 has improved. If the fairness index for the ones of the AP 102 and the RE 104 has decreased, the fair share throughput comparator 204 determines that the fair share throughput of one or more of the RE 104, the STA 106, the STA 108, the STA 110, or the STA 112 has not improved. In the example, the bandwidth analyzer 118 calculates Jain's Fairness Index for each of the RE 104 and the AP 102 to determine the relative fairness of the weights of the fair share throughput associated with each of the RE 104 and the STAs 106, 108, 110, 112. In other examples, different fairness indices are used. For example, other suitable fairness indices include fairness indices based on airtime, transmission control protocol flow, and quality of experience for the ones of the RE 104, the STA 106, the STA 108, the STA 110, and the STA 112. In the example, the bandwidth analyzer 118 uses the dataflow of each of the RE 104 and the STAs 106, 108, 110, 112, the fair share throughput of each of the RE 104, and the STAs 106, 108, 110, 112 and the number of devices communicating with the AP 102 (e.g., the RE 104, the STAs 106, 108, 110, 112, etc.). In other examples, other suitable fairness indices can be used to determine the relative fairness of the weights of fair share throughput associated with each of the RE 104 and the STAB 106, 108, 110, 112.

Additionally, the bandwidth analyzer 118 selects one of the RE 104, the STA 106, the STA 108, the STA 110, or the STA 112 with the lowest fairness. The example bandwidth analyzer 118 adjusts the fair share throughput of the one of the RE 104, the STA 106, the STA 108, the STA 110, or the STA 112 with the lowest fairness such that the dataflow associated with the one of the RE 104, the STA 106, the STA 108, the STA 110, or the STA 112 with the lowest fairness is closer to the fair share throughput. Additionally, the bandwidth analyzer 118 adjusts the other devices connected to the one or more of the AP 102 and the RE 104 such that the dataflows associated with the other devices are closer to the fair share throughput of the other devices.

The example bandwidth analyzer 118 determines whether the throughput of the ones of the RE 104, the STA 106, the STA 108, the STA 110, or the STA 112 without the lowest fairness (e.g., more fair) has improved. In this manner, the example bandwidth analyzer 118 determines whether the dataflows of the one of the RE 104, the STA 106, the STA 108, the STA 110, or the STA 112 without the lowest fairness has increased.

In response to the dataflows of the one of the RE 104, the STA 106, the STA 108, the STA 110, or the STA 112 without the lowest fairness increasing, the example bandwidth analyzer 118 updates the demand of the ones of the RE 104, the STA 106, the STA 108, the STA 110, or the STA 112 without the lowest fairness. The example bandwidth analyzer 118 updates the demand of the ones of the RE 104, the STA 106, the STA 108, the STA 110, or the STA 112 without the lowest fairness by defining the demanded dataflow of the ones of the RE 104, the STA 106, the STA 108, the STA 110, or the STA 112 without the lowest fairness to reflect a candidate dataflow for the ones of the RE 104, the STA 106, the STA 108, the STA 110, or the STA 112 without the lowest fairness. The candidate dataflow represents an expected required dataflow for the ones of the RE 104, the STA 106, the STA 108, the STA 110, or the STA 112 without the lowest fairness.

Figure 2:
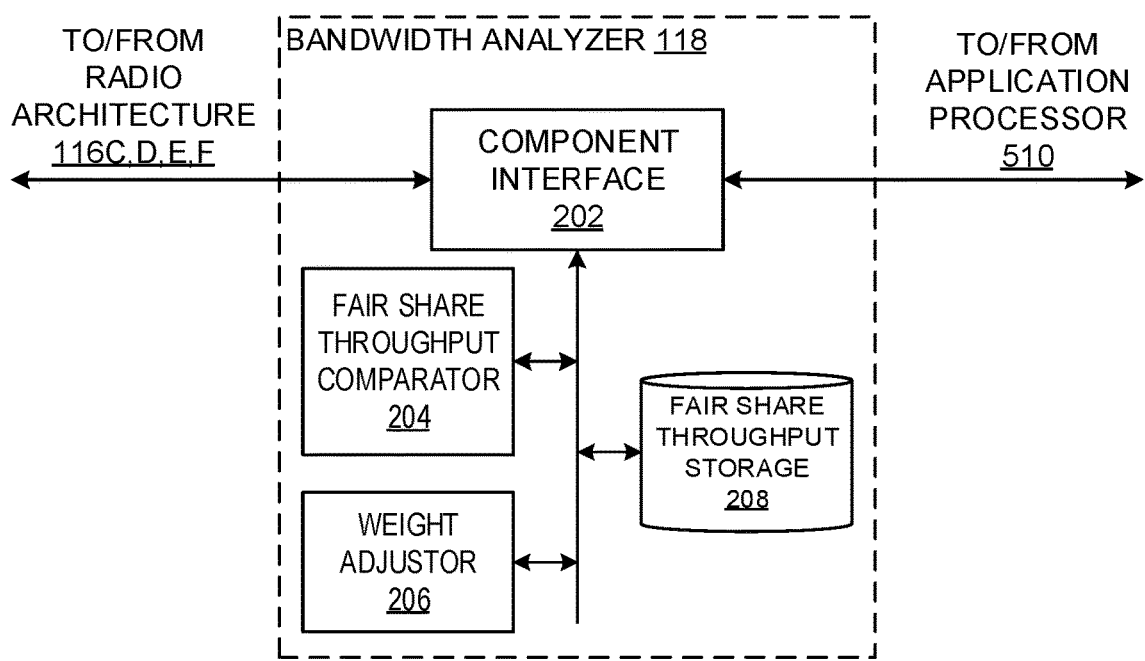
FIG. 2 is a block diagram of an example bandwidth analyzer of FIG. 1.

FIG. 2 is a block diagram of an example implementation 200 of the bandwidth analyzer 118 of FIG. 1, disclosed herein, to facilitate dynamic adapting to demands of STAs by observing network traffic without any prior knowledge of traffic between the AP 102 and one or more of the STAs 106, 108, and the RE 104 and one or more of the STAs 110, 112.

The bandwidth analyzer 118 is coupled to the radio architecture 116C,D,E,F and the application processor 510. The example bandwidth analyzer 118 include a component interface 202, a fair share throughput comparator 204, a weight adjustor 206, and a fair share throughput storage 208. The component interface 202 is coupled to the fair share throughput comparator 204, the weight adjustor 206, the fair share throughput storage 208, the radio architecture 116C, D,E,F, and the application processor 510. The fair share throughput comparator 204 is coupled to the component interface 202, the weight adjustor 206, and the fair share throughput storage 208. The weight adjustor 206 is coupled to the component interface 202, the fair share throughput comparator 204, and the fair share throughput storage 208. The fair share throughput storage 208 is coupled to the component interface 202, the fair share throughput comparator 204, and the weight adjustor 206.

The example component interface 202 is a hardware communication interface that transfers data to and/or receive data from one or more of the fair share throughput comparator 204, the weight adjustor 206, the fair share throughput storage 208, the radio architecture 116C,D,E,F, the application processor 510, or the network 114 of FIG. 1. In some examples, the component interface 202 can transfer data to and/or receive data from any component of the bandwidth analyzer 118. In some examples, the component interface 202 can be implemented by a hardware circuit configured to interface signals from one of the fair share throughput comparator 204, the weight adjustor 206, the fair share throughput storage 208, the radio architecture 116C, D,E,F, and the application processor 510. Further, in some examples the interface standard of the component interface 202 is to match at least one of the interface of the fair share throughput comparator 204, the weight adjustor 206, the fair share throughput storage 208, the radio architecture 116C, D,E,F, the application processor 510, or the network 114 of FIG. 1. In further examples, the interface standard of the component interface 202 is to be converted to match the interface of the fair share throughput comparator 204, the weight adjustor 206, the fair share throughput storage 208, the radio architecture 116C,D,E,F, the application processor 510, or the network 114 of FIG. 1.

The example fair share throughput comparator 204 is a hardware logic circuit that determines whether the dataflow of one or more of the RE 104, the STA 106, the STA 108, the STA 110, or the STA 112 is below the fair share throughput of one or more of the RE 104, the STA 106, the STA 108, the STA 110, or the STA 112, respectively by analyzing the transmission obtained by the radio architecture 116 A,B. The fair share throughput comparator 204 sets the fair share throughput for the devices connected to the AP 102 and the RE 104. For example, the fair share throughput comparator 204 sets the fair share throughput for the RE 104, the STA 106, the STA 108, the STA 110, and the STA 112. The example fair share throughput comparator 204 sets the fair share throughput for the RE 104, the STA 106, the STA 108, the STA 110, and the STA 112 by determining the number of the RE 104, the STA 106, the STA 108, the STA 110, and the STA 112 being provided the network 114 (e.g., three for the AP 102 and two for the RE 104). The fair share throughput comparator 204 determines the dataflow for the RE 104, the STA 106, the STA 108, the STA 110, and the STA 112. The fair share throughput comparator 204 determines the dataflow by determining the number of data packets and size of each data packet sent to each of the RE 104, the STA 106, the STA 108, the STA 110, and the STA 112 over a specified period of time. For example, the fair share throughput comparator 204 determines that five data packets are sent to the STA 106 over a period of five seconds (s), each data packet containing 15 megabytes (MB). In the example, the fair share throughput comparator 204 determines the second dataflow to the STA 106 is 15 MB/s.

The example fair share throughput comparator 204 determines whether the dataflow associated with one or more of the RE 104, STA 106, STA 108, STA 110, or the STA 112 is below the fair share throughput for the RE 104, STA 106, STA 108, STA 110, and the STA 112, respectively. In response to determining that one or more of the dataflows associated with the RE 104, STA 106, STA 108, STA 110, or the STA 112 is below the fair share throughput for the RE 104, STA 106, STA 108, STA 110, and the STA 112, respectively, the weight adjustor 206 adjusts the weight of the fair share throughput of one or more of the RE 104, STA 106, STA 108, STA 110, or the STA 112. The weight adjustor 206 adjusts the weights of the fair share throughput of the one or more of the RE 104, STA 106, STA 108, STA 110, or the STA 112 by calculating a fairness for each of the RE 104, the STA 106, the STA 108, the STA 110, and the STA 112. In the example, the weight adjustor 206 calculates the fairness based on the dataflow for each of the RE 104, the STA 106, the STA 108, the STA 110, and the STA 112 and the present value for the fair share throughput of the RE 104, the STA 106, the STA 108, the STA 110, and the STA 112. In this manner, a low fairness is associated with one of the RE 104, the STA 106, the STA 108, the STA 110, and the STA 112 that has a dataflow that is below the fair share throughput for the one of the RE 104, the STA 106, the STA 108, the STA 110, and the STA 112. Additionally, a high fairness is associated with one of the RE 104, the STA 106, the STA 108, the STA 110, and the STA 112 that has a dataflow that is closer to the fair share throughput for the one of the RE 104, the STA 106, the STA 108, the STA 110, and the STA 112.

Additionally, to adjust one or more of the weights for the fair share throughput of the RE 104, the STA 106, the STA 108, the STA 110, or the STA 112, the weight adjustor 206 selects one of the RE 104, the STA 106, the STA 108, the STA 110, or the STA 112 with the lowest fairness. The example weight adjustor 206 adjusts the fair share throughput of the one of the RE 104, the STA 106, the STA 108, the STA 110, or the STA 112 with the lowest fairness such that the dataflow associated with the one of the RE 104, the STA 106, the STA 108, the STA 110, or the STA 112 with the lowest fairness is closer to the fair share throughput. Moreover, the weight adjustor 206 selects a weight value for the fair share throughput of the one of the RE 104, the STA 106, the STA 108, the STA 110, or the STA 112 with the lowest fairness such that the dataflow of the one of the RE 104, the STA 106, the STA 108, the STA 110, or the STA 112 with the lowest fairness is closer to the fair share throughput of the one of the RE 104, the STA 106, the STA 108, the STA 110, or the STA 112 with the lowest fairness.

Selecting a weight for the fair share throughput of the one of the RE 104, the STA 106, the STA 108, the STA 110, or the STA 112 with the lowest fairness that is closer to the dataflow of the one of the RE 104, the STA 106, the STA 108, the STA 110, or the STA 112 with the lowest fairness allocates a portion of the bandwidth of the AP 102 or the RE 104 to be available fair share throughput. Available fair share throughput corresponds to fair share throughput that has not been allocated to any of the devices communicating with the AP 102 or the RE 104.

The example weight adjustor 206 adjusts the fair share throughput of the other devices connected to the one or more of the AP 102 and the RE 104 such that the dataflows associated with the other devices are closer to the fair share throughput of the other devices. Moreover, the weight adjustor 206 adjusts the fair share throughputs of the other devices based on an availability of fair share throughput. Additionally, the weight adjustor 206 selects a weight for one or more of the fair share throughputs for the ones of the RE 104, the STA 106, the STA 108, the STA 110, or the STA 112 without the lowest fairness. The weight selected by the weight adjustor 206 is based on a candidate dataflow that the fair share throughput comparator 204 determines based on whether the dataflow for ones of the RE 104, the STA 106, the STA 108, the STA 110, or the STA 112 without the lowest fairness is equal to the fair share throughput for the ones of the RE 104, the STA 106, the STA 108, the STA 110, or the STA 112 without the lowest fairness. If the dataflow for ones of the RE 104, the STA 106, the STA 108, the STA 110, or the STA 112 without the lowest fairness was equal to the fair share throughput for the ones of the RE 104, the STA 106, the STA 108, the STA 110, or the STA 112 without the lowest fairness, the weight adjustor 206 selects a weight that is higher than the current weight. If the dataflow for ones of the RE 104, the STA 106, the STA 108, the STA 110, or the STA 112 without the lowest fairness was less than the fair share throughput for the ones of the RE 104, the STA 106, the STA 108, the STA 110, or the STA 112 without the lowest fairness, the weight adjustor 206 selects a weight that is lower than the current weight. In this way, through multiple iterations of the bandwidth analyzer 118, the fair share throughput comparator 204 and the weight adjustor 206 monitor the dataflows of the RE 104, the STA 106, the STA 108, the STA 110, or the STA 112 to determine the optimal weight for the fair share throughputs of the RE 104, the STA 106, the STA 108, the STA 110, or the STA 112.

The example fair share throughput comparator 204 observes the dataflows of the RE 104, the STA 106, the STA 108, the STA 110, or the STA 112 with the new weight values and determines whether the dataflows of the RE 104, the STA 106, the STA 108, the STA 110, or the STA 112 are closer to the fair share throughputs for the RE 104, the STA 106, the STA 108, the STA 110, or the STA 112. The fair share throughput comparator 204 determines whether the fair share throughputs of one or more of the RE 104, the STA 106, the STA 108, the STA 110, or the STA 112 has improved as compared to the previous fair share throughputs of one or more of the RE 104, the STA 106, the STA 108, the STA 110, or the STA 112. In this manner, the fair share throughput comparator 204 accesses the previous values of the fair share throughput. For example, the fair share throughput comparator 204 calculates a fairness index of the ones of the AP 102 and the RE 104 according to the present values of the fair share throughputs and the previous values of the fair share throughputs. If the fairness index for the ones of the AP 102 and the RE 104 has increased, the fair share throughput comparator 204 determines that the fair share throughput of one or more of the RE 104, the STA 106, the STA 108, the STA 110, or the STA 112 has improved. If the fairness index for the ones of the AP 102 and the RE 104 has decreased, the fair share throughput comparator 204 determines that the fair share throughput of one or more of the RE 104, the STA 106, the STA 108, the STA 110, or the STA 112 has not improved. In response to determining that the data flows of the RE 104, the STA 106, the STA 108, the STA 110, or the STA 112 are not closer to the fair share throughputs of the RE 104, the STA 106, the STA 108, the STA 110, or the STA 112, the fair share throughput comparator updates the demand of the RE 104, the STA 106, the STA 108, the STA 110, or the STA 112.

In the example, the fair share throughput comparator 204 calculates Jain's Fairness Index for each of the AP 102 and the RE 104 to determine the relative fairness of the weights of the fair share throughput associated with each of the RE 104, the STA 106, the STA 108, the STA 110, and the STA 112. In the example, the fair share throughput comparator 204 uses the dataflow of each of the RE 104, the STA 106, the STA 108, the STA 110, the STA 112; and the number of devices communicating with the AP 102 (e.g., the RE 104, the STA 106, the STA 108, etc.) and the RE 104 (e.g., the STA 110, the STA 112, etc.). For example, Jain's Fairness Index is determined by the fair share throughput comparator 204 as describes in equation 1.

$$J(x_1, x_2, \ldots, x_n) = \frac{\left(\sum_{i=1}^{n} T_i\right)^2}{n * \sum_{i=1}^{n} T_i^2} \quad \text{Equation 1}$$

In equation 1, $x_1, x_2, \ldots, x_n$ represent the AP 102 and the RE 104. The variable n represents the number of devices communicating with the AP 102 and the RE 104. The variable T represents the dataflow for the devices communicating with the AP 102 and the RE 104. In other examples, other suitable fairness indices can be used to determine the relative fairness of the weights of the fair share throughput associated with each of the AP 102 and the RE 104. For example, other suitable fairness indices include fairness indices based on airtime, transmission control protocol flow, and quality of experience for the ones of the RE 104, the STA 106, the STA 108, the STA 110, and the STA 112.

The fair share throughput comparator 204 and the weight adjustor 206 may alternatively be implemented with the addition of machine learning. When implementing machine learning, a machine learning engine uses a RL algorithm to learn what the optimal weights for the different fair share throughputs are for the different STAs connected to APs in a multi AP environment. For example, the machine learning engine (e.g., the bandwidth analyzer 118) iteratively determines the optimal weights for the fair share throughputs of the different STAs in communication with an AP by setting weights in a first attempt and determining the fairness index of the AP and then adjusting the weights of the fair share throughputs in subsequent attempts to optimize the fairness index of the AP. The weights are optimized because the dataflows and the fair share throughput correspond to weighted fair share throughputs that fairly distribute the bandwidth of the AP 102 and/or the RE 104 amongst the ones of the RE 104, the STA 106, the STA 108, the STA 110, or the STA 112 such that the actual throughput of the ones of the RE 104, the STA 106, the STA 108, the STA 110, or the STA 112 is within a threshold value of the fair share throughput of the ones of the RE 104, the STA 106, the STA 108, the STA 110, or the STA 112. Other machine learning algorithms may be used to implement the bandwidth analyzer 118 of FIG. 2 such that the fair share throughput comparator 204 and the weight adjustor 206 dynamically optimize fairness for the different STAs connected to an AP.

The weight adjustor 206 processes the dataflows of the ones of the RE 104, the STA 106, the STA 108, the STA 110, or the STA 112 and the fair share throughputs of the ones of the RE 104, the STA 106, the STA 108, the STA 110, or the STA 112 through a RL machine learning model. A block of pseudocode describing the function of the bandwidth analyzer 118 is shown below in Pseudocode 1.

Pseudocode 1

| | |
|---|---|
| 1. | $\hat{R} = \{r_{MCS_i}\}_{i=1}^{n}$ |
| 2. | $\vec{W} = \left\{\|A\| * \frac{1}{n}\right\}_{A \in \{GW, RE_i\}}$ |
| 3. | $\vec{Q} = 0$ |
| 4. | while B > 0 do |
| 5. | $\quad \vec{W} \leftarrow$ SelectWeightValue($\vec{Q}$) |
| 6. | $\quad \vec{T} \leftarrow$ ObserveThroughput(N) |
| 7. | $\quad$ reward $\leftarrow$ ComputeFairness(T, $\hat{T}$) |
| 8. | $\quad \vec{Q} \leftarrow$ UpdateValueFunction(reward, $\vec{W}$) |
| 9. | $\quad \hat{R} \leftarrow$ UpdateFairThroughput(R, $\hat{R}$) |
| 10. | $\quad$ B $\leftarrow$ B $-1$ |
| 11. | end while |

Line 1 of Pseudocode 1 instantiates a one dimensional matrix including the fair share throughput values for the ones of the RE 104, the STA 106, the STA 108, the STA 110, and the STA 112 according to a generic unoptimized set of fair share throughput values for the ones of the RE 104, the STA 106, the STA 108, the STA 110, and the STA 112. Line 2 of Pseudocode 1 sets the generic unoptimized weights for the fair share throughputs of the ones of the RE 104, the STA 106, the STA 108, the STA 110, and the STA 112. For example, the vector $\vec{W}$ includes the weight for each fair share throughput for the ones of the RE 104, the STA 106, the STA 108, the STA 110, and the STA 112. |A| represents the optimal bandwidth for the system (e.g., the AP 102 and the RE 104) such that |A| is included in the bandwidth for the AP 102 and the bandwidth for the RE 104. $\vec{Q}$ is a placeholder variable to determine how much each of the RE 104, the STA 106, the STA 108, the STA 110, and the STA 112 demands for a dataflow. B is the budget or the number of attempts to run to optimize the weights of the fair share throughputs.

While the budget is above 0, the weight adjustor 206 populates IV with weight values for the fair share throughputs of the ones of the RE 104, the STA 106, the STA 108, the STA 110, and the STA 112 that are selected based on the current dataflow and the current fair share throughput of the RE 104, the STA 106, the STA 108, the STA 110, and the STA 112. The weight adjustor 206 calculates weights based on the actual throughput and the fair share throughput of the ones of the RE 104 and the STAs 106, 108, and/or the STAs 110, 112. The estimated weight is shown below in Equation 2.

$$\hat{W}_i = \underset{W \in \mathfrak{R}_p}{\operatorname{argmax}} J(\vec{T}, \vec{R^*}) \text{ s.t. } \sum_{i}^{p} W_i = 1; r_j^* \leq r_j, j \in \{1, \ldots, n\} \quad \text{Equation 2}$$

Equation 2 defines the optimal weight assignment for the fair share throughputs for the different STAs or REs connected to an AP. The variable $W_i$ represents the weight of the individual fair share throughputs for the ones of the RE 104, the STA 106, the STA 108, the STA 110, and the STA 112 represented as each instance i. The weights for the individual fair share throughputs are determined such that the fairness index $J(\vec{T}, \vec{R^*})$ is optimized for the dataflows of the ones of the RE 104, the STA 106, the STA 108, the STA 110, and the STA 112 ($\vec{T}$), and the fair share throughput for the ones of the RE 104, the STA 106, the STA 108, the STA 110, and the STA 112 ($\vec{R^*}$). The weights of the fair share throughputs $W_i$ are constrained such that the sum of the weights is within the bandwidth (p) of the AP or RE in which Pseudocode 1 is implemented.

The fair share throughput comparator 204 populates a vector $\vec{T}$ with the dataflows of the ones of the RE 104, the STA 106, the STA 108, the STA 110, and the STA 112.

At line 7 of the Pseudocode 1, the fair share throughput comparator 204 calculates the reward based on the fairness of the dataflow versus the fair share throughput of the ones of the RE 104 and the STAs 106, 108, and/or the STAs 110, 112. The reward is measured by Jain's Fairness Index. In other examples the reward is any other suitable fairness index. For example, other suitable fairness indices include fairness indices based on airtime, transmission control protocol flow, and quality of experience for the ones of the RE 104, the STA 106, the STA 108, the STA 110, and the STA 112. At line 8 of the Pseudocode 1, the weight adjustor 206 adjusts the demand of the RE 104, the STA 106, the STA 108, the STA 110, and the STA 112 based on the reward values and the first estimate of the weights. The demands of the RE 104, the STA 106, the STA 108, the STA 110, and the STA 112 are adjusted using multi-arm bandit problems, e-greedy selection rules, or other alternative gradient descend update function that target the direction of the change of the reward values.

At line 9, the fair share throughput of the ones of the RE 104 and the STAs 106, 108, and/or the STAs 110, 112 is updated based on the original fair share throughput of the ones of the RE 104 and the STAs 106, 108, and/or the STAs 110, 112 and the individual fair share throughput of the ones of the RE 104 and the STAs 106, 108, and/or the STAs 110, 112. The fair share throughput values are updated using multi-arm bandit problems, e-greedy selection rules, or other alternative gradient descend update function that target the direction of the change of the reward values. At line 10, the budget is reduced by 1.

The example fair share throughput storage 208 of the example bandwidth analyzer 118 of FIG. 1 is in communication with at least the radio architecture 116C,D,E,F and the application processor 510 via the component interface 202. The fair share throughput storage 208 is capable of storing one or more parameters and/or characteristics associated with the bandwidth analyzer 118. In some examples, the fair share throughput storage 208 can store at least identification information associated with the ones of the RE 104 and the STAs 106, 108, and/or the STAs 110, 112, dataflows for the ones of the RE 104 and the STAs 106, 108, and/or the STAs 110, 112, the fair share throughputs for the ones of the RE 104 and the STAs 106, 108, and/or the STAs 110, 112, weights for the fair share throughputs for the ones of the RE 104 and the STAs 106, 108, and/or the STAs 110, 112 and the demands for the ones of the RE 104 and the STAs 106, 108, and/or the STAs 110, 112. In some examples the fair share throughput storage 208 stores one or more machine learning models corresponding to dataflows and fair share throughputs of the ones of the RE 104 and the STAs 106, 108, and/or the STAs 110, 112.

Further, the fair share throughput storage 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The fair share throughput storage 208 may additionally or alternatively be implemented by one or more double data rate (DDR) memories, such as DDR, DDR2, DDR3, mobile DDR (mDDR), etc. The fair share throughput storage 208 may additionally or alternatively be implemented by one or more mass storage devices such as hard disk drive(s), compact disk drive(s), digital versatile disk drive(s), etc. While in the illustrated example the fair share throughput storage 208 is illustrated as a single database, the fair share throughput storage 208 may be implemented by any number and/or type(s) of databases. Further, the fair share throughput storage 208 be located in the bandwidth analyzer 118 or at a central location outside of the bandwidth analyzer 118 (e.g., the application processor 510). Furthermore, the data stored in the fair share throughput storage 208 may be in any data format such as, for example, binary data, comma delimited data, tab delimited data, structured query language (SQL) structures, etc.

Figure 3:
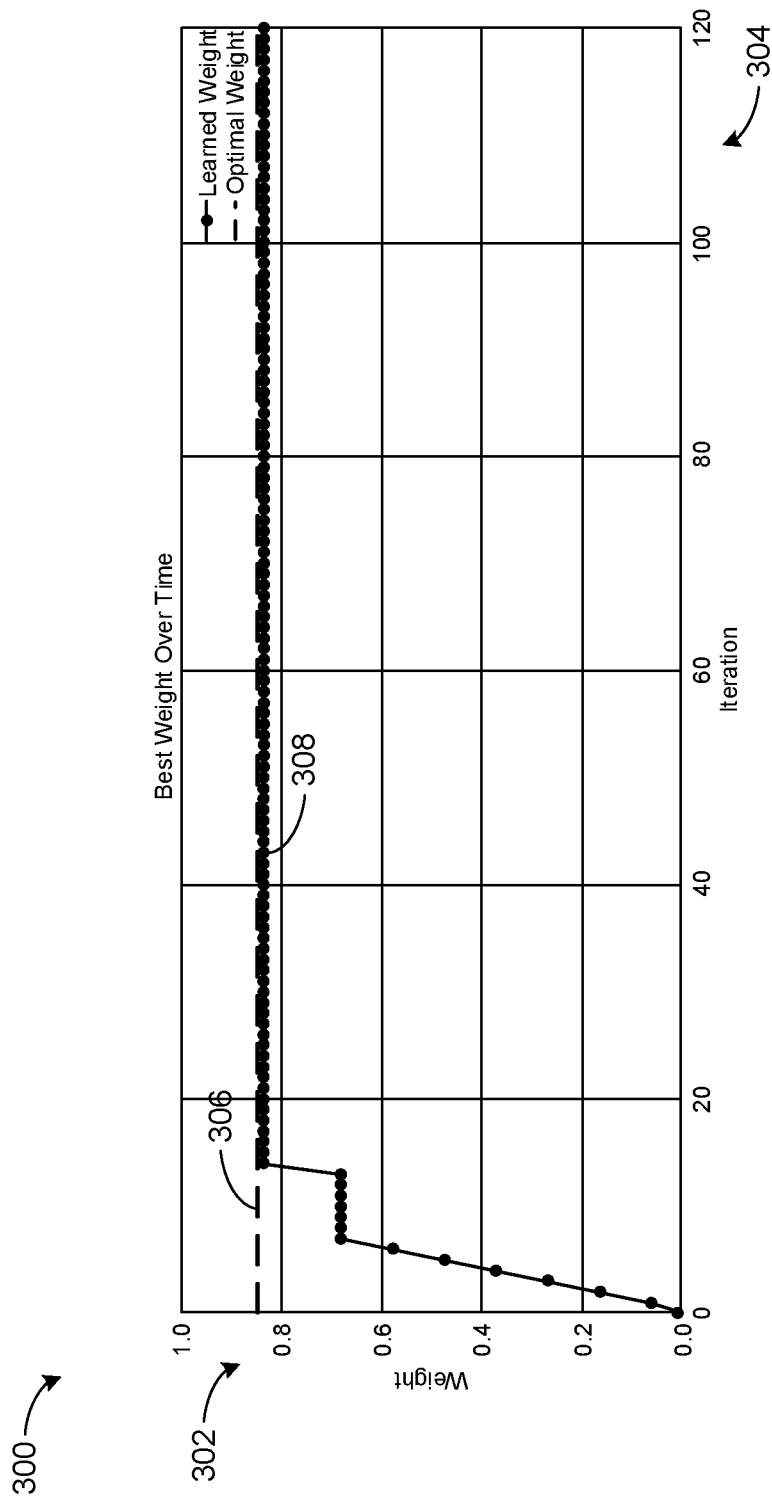
FIG. 3 is an example graph illustrating example weights for fair share throughputs associated with STAs in a network over time according to an example implementing the example bandwidth analyzer of FIG. 2.

FIG. 3 is an example graph 300 illustrating example weights over time according to an example implementing the bandwidth analyzer 118. The example graph 300 illustrates WFQ when implementing the bandwidth analyzer 118 in a multi-AP environment including two STAs, the STA 106 and the STA 112. The graph 300 includes a y-axis 302, an x-axis 304, an optimal weight curve 306 illustrating the optimal weight for the fair share throughput of the RE 104 providing the network 114 to the STA 112, and a learned weight curve 308 illustrating the learned weight for the fair share throughput of the STA 106.

The y-axis 302 illustrates the weight of a fair share throughput for the RE 104 providing the network 114 to the STA 112. A value of 1.0 on the y-axis represents the entirety of the bandwidth of the AP 102 being allocated to the RE 104 providing the network 114 to the STA 112. The x-axis 304 illustrates a number of iterations of the bandwidth analyzer 118 to reach a threshold value of the optimal weight curve 306. In the example the optimal weight curve 306 is at a value of 0.96. The optimal weight curve 306 represents the optimal weight of the fair share throughput for the RE 104 providing the network 114 to the STA 112. The value of the weight for the fair share throughput of the RE 104 providing the network 114 to the STA 112 represents the percentage of the bandwidth of the AP 102 allocated to the RE 104. In the example, the percentage of the bandwidth of the AP 102 allocated to the STA 112 is equal to 1-0.96. The learned weight curve 308 represents the weights selected by the bandwidth analyzer 118 at each iteration when attempting to optimize the weights of the fair share throughputs of the RE 104 and the STA 106.

In the example, if the AP 102 has a bandwidth of 100 MB/s the RE 104 is allocated 96 MB/s by the bandwidth analyzer 118 while the STA 106 is allocated 4 MB/s by the bandwidth analyzer 118. In the example the RE 104 is providing the network 114 to the STA 112 and the STA 112 is streaming 4K video. In the example the STA 106 is sending text messages. The STA 112 requires a higher dataflow than the fair share throughput of the STA 106. In the example, the bandwidth analyzer 118 requires less than 20 iterations to allocate the demanded dataflow to the STA

112. At the first iteration of the learned weight curve 308, the STA 106 is allocated 100 MB/s. Between the first iteration of the learned weight curve 308 and the iteration where the bandwidth analyzer 118 to reach a threshold value of the optimal weight curve 306, the bandwidth analyzer 118 selects different weights for the fair share throughput of the STA 106 and the RE 104 and calculates a fairness for each of the STA 106 and the RE 104 to determine whether the weights of the fair share throughput for the STA 106 and the RE 104 are effective. The bandwidth analyzer 118 determines the weight for the fair share throughput for the RE 104 and the weight for the fair share throughput for the STA 106 such that the fairness of the STA 106 and the fairness index of the RE 104 approach optimal fairness. In the example the optimal fairness if 1.

The example of FIG. 3 illustrates one example where the AP 102 provides the network 114 to the RE 104 and the STA 106. It will be appreciated that examples where the AP 102 provides the network 114 to the RE 104, the STA 106 and the STA 108, and the RE 104 provides the network 114 to the STA 110 and the STA 112 function similarly to or the same as the example of FIG. 3. In such examples, a first bandwidth analyzer 118 included in the AP 102 determines the weights of the fair share throughputs of the RE 104, the STA 106, and the STA 108 such that the fairness of each of the RE 104, the STA 106, and the STA 108 approaches the optimal fairness. In other words, the first bandwidth analyzer 118 determines the weights of the RE 104, the STA 106, and the STA 108 such that the dataflow of the RE 104, the STA 106, and the STA 108 are closer to the fair share throughput of the RE 104, the STA 106, and the STA 108, respectively. Additionally, in such examples, a second bandwidth analyzer 118 determines the weights of the fair share throughputs of the STA 110 and the STA 112 such that the fairness of each of the STA 110 and the STA 112 approach the optimal fairness. In other words, the second bandwidth analyzer 118 determines the weights of the STA 110 and the STA 112 such that the dataflow of the STA 110 and the STA 112 are closer to the fair share throughput of the STA 110 and the STA 112, respectively.

While an example manner of implementing the bandwidth analyzer 118 of FIG. 1 is illustrated in FIG. 2, one or more of the elements, processes and/or devices illustrated in FIG. 2 may be combined, divided, re-arranged, omitted, eliminated and/or implemented in any other way. Further, the fair share throughput comparator 204, the example weight adjustor 206, the example fair share throughput storage 208 and/or, more generally, the example bandwidth analyzer 118 of FIG. 2 may be implemented by hardware, software, firmware and/or any combination of hardware, software and/or firmware. Thus, for example, any of the fair share throughput comparator 204, the example weight adjustor 206, the example fair share throughput storage 208 and/or, more generally, the example bandwidth analyzer 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the fair share throughput comparator 204, the example weight adjustor 206, the example fair share throughput storage 208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example bandwidth analyzer 118 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
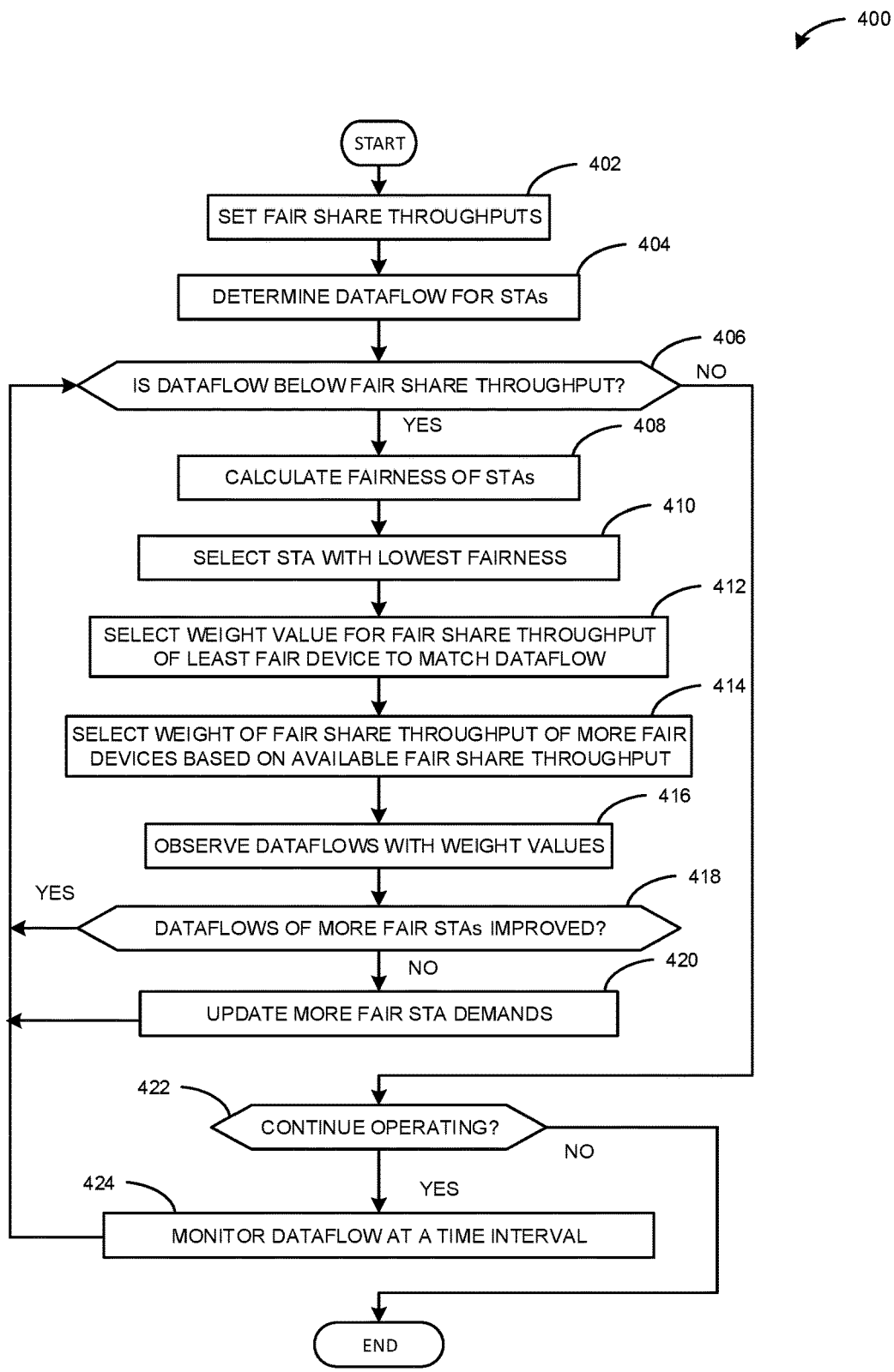
FIG. 4 is an example flowchart representative of machine readable instructions that may be executed to implement one or more of the access points or range extenders of FIG. 1.

A flowchart representative of example hardware logic, machine readable instructions, hardware implemented state machines, and/or any combination thereof for implementing the bandwidth analyzer 118 of FIG. 2 is shown in FIG. 4. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 4, many other methods of implementing the example bandwidth analyzer 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is an example flowchart representative of machine readable instructions that may be executed to implement one or more of the AP 102 and the RE 104 of FIG. 1. For example, the program 400 of FIG. 4 implements the bandwidth analyzer 118 included in the AP 102 and the RE 104. The program 400 begins at block 402 where the fair share throughput comparator 204 of the bandwidth analyzer 118 sets the fair share throughputs of the RE 104, the STA 106, the STA 108, the STA 110, or the STA 112. For example, the fair share throughput comparator 204, at block 402, sets the fair share throughput of the RE 104, the STA 106, the STA 108, the STA 110, or the STA 112 based on the number of the RE 104, the STA 106, the STA 108, the STA 110, or the STA 112 connected to the AP 102 and/or the RE 104.

At block 404, the fair share throughput comparator 204 determines the dataflows associated with each of the RE 104, the STA 106, the STA 108, the STA 110, or the STA 112. For example, at block 404, the fair share throughput comparator 204 determines the dataflow by determining the number of data packets and size of each data packet sent to each of the RE 104, the STA 106, the STA 108, the STA 110, and the STA 112 over a specified period of time. For example, the fair share throughput comparator 204 determines that five data packets are sent to the STA 106 over a period of five seconds (s), each data packet containing 15 megabytes (MB).

At block 406, the fair share throughput comparator 204 determines whether the dataflow for one or more of the RE 104, the STA 106, the STA 108, the STA 110, and the STA 112 is below the fair share throughput of one or more of the RE 104, the STA 106, the STA 108, the STA 110, and the STA 112. If the fair share throughput comparator 204 determines the dataflow for one or more of the RE 104, the STA 106, the STA 108, the STA 110, and the STA 112 is below the fair share throughput of one or more of the RE 104, the STA 106, the STA 108, the STA 110, and the STA 112 (block 406: YES), the program 400 proceeds to block 408. Alternatively, if the fair share throughput comparator 204 determines the dataflow for one or more of the RE 104, the STA 106, the STA 108, the STA 110, and the STA 112 is not below the fair share throughput of one or more of the RE 104, the STA 106, the STA 108, the STA 110, and the STA 112 (block 406: NO), the program 400 proceeds to block 422. When the program 400 proceeds to block 422 (block 406: NO), the dataflow for the RE 104, the STA 106, the STA 108, the STA 110, and the STA 112 is at the fair share throughput for the RE 104, the STA 106, the STA 108, the STA 110, and the STA 112 and the fairness indices of the RE 104, the STA 106, the STA 108, the STA 110, and the STA 112 have been optimized. The dataflow of the RE 104, the STA 106, the STA 108, the STA 110, and the STA 112 is considered to be at the fair share throughput for the RE 104, the STA 106, the STA 108, the STA 110, and the STA 112 when the dataflow of the RE 104, the STA 106, the STA 108, the STA 110, and the STA 112 is within a threshold value below the fair share throughput for the RE 104, the STA 106, the STA 108, the STA 110, and the STA 112.

At block 408, the weight adjustor 206 calculates the fairness of the RE 104, the STA 106, the STA 108, the STA 110, and the STA 112. In the example, the weight adjustor 206, at block 408, calculates the fairness based on the dataflow for each of the RE 104, the STA 106, the STA 108, the STA 110, and the STA 112 and the present value for the fair share throughput of the RE 104, the STA 106, the STA 108, the STA 110, and the STA 112. In this manner, a low fairness is associated with one of the RE 104, the STA 106, the STA 108, the STA 110, and the STA 112 that has a dataflow that is below the fair share throughput for the one of the RE 104, the STA 106, the STA 108, the STA 110, and the STA 112. Additionally, a high fairness is associated with one of the RE 104, the STA 106, the STA 108, the STA 110, and the STA 112 that has a dataflow that is closer to the fair share throughput for the one of the RE 104, the STA 106, the STA 108, the STA 110, and the STA 112.

At block 410, the weight adjustor 206 selects the one of the RE 104, the STA 106, the STA 108, the STA 110, and the STA 112 with the lowest fairness. The weight adjustor 206 selects the one of the RE 104, the STA 106, the STA 108, the STA 110, and the STA 112 with the lowest fairness such that the one of the RE 104, the STA 106, the STA 108, the STA 110, and the STA 112 with the lowest fairness is to be adjusted for a higher fairness.

At block 412, to adjust one or more of the weights for the fair share throughput of the RE 104, the STA 106, the STA 108, the STA 110, or the STA 112, the weight adjustor 206 selects one of the RE 104, the STA 106, the STA 108, the STA 110, or the STA 112 with the lowest fairness. The example weight adjustor 206, at block 412, adjusts the fair share throughput of the one of the RE 104, the STA 106, the STA 108, the STA 110, or the STA 112 with the lowest fairness such that the dataflow associated with the one of the RE 104, the STA 106, the STA 108, the STA 110, or the STA 112 with the lowest fairness is closer to the fair share throughput. Moreover, the weight adjustor 206, at block 412, selects a weight value for the fair share throughput of the one of the RE 104, the STA 106, the STA 108, the STA 110, or the STA 112 with the lowest fairness such that the dataflow of the one of the RE 104, the STA 106, the STA 108, the STA 110, or the STA 112 with the lowest fairness is closer to the fair share throughput of the one of the RE 104, the STA 106, the STA 108, the STA 110, or the STA 112 with the lowest fairness.

At block 414, the example weight adjustor 206 adjusts the other devices connected to the one or more of the AP 102 and the RE 104 such that the dataflows associated with the other devices are closer to the fair share throughput of the other devices. Moreover, the weight adjustor 206, at block 414, selects a weight for one or more of the fair share throughputs for the ones of the RE 104, the STA 106, the STA 108, the STA 110, or the STA 112 without the lowest fairness. The weight selected by the weight adjustor 206 is based on a candidate dataflow that the fair share throughput comparator 204 determines based on whether the dataflow for ones of the RE 104, the STA 106, the STA 108, the STA 110, or the STA 112 without the lowest fairness is equal to the fair share throughput for the ones of the RE 104, the STA 106, the STA 108, the STA 110, or the STA 112 without the lowest fairness. If the dataflow for ones of the RE 104, the STA 106, the STA 108, the STA 110, or the STA 112 without the lowest fairness was equal to the fair share throughput for the ones of the RE 104, the STA 106, the STA 108, the STA 110, or the STA 112 without the lowest fairness, the weight adjustor 206 selects a weight that is higher than the current weight. If the dataflow for ones of the RE 104, the STA 106, the STA 108, the STA 110, or the STA 112 without the lowest fairness was less than the fair share throughput for the ones of the RE 104, the STA 106, the STA 108, the STA 110, or the STA 112 without the lowest fairness, the weight adjustor 206 selects a weight that is lower than the current weight.

At block 416, the fair share throughput comparator 204 observes the dataflows of the RE 104, the STA 106, the STA 108, the STA 110, and the STA 112 with the updated weight values. At block 418, the fair share throughput comparator 204 determines whether the fair share throughputs of one or more of the RE 104, the STA 106, the STA 108, the STA 110, or the STA 112 has improved as compared to the previous fair share throughputs of one or more of the RE 104, the STA 106, the STA 108, the STA 110, or the STA 112. In this manner, the fair share throughput comparator 204, at block 418, accesses the previous values of the fair share throughput, stored in the fair share throughput storage 208. For example, the fair share throughput comparator 204 calculates a fairness index of the ones of the AP 102 and the RE 104 according to the present values of the fair share throughputs and a fairness index of the ones of the AP 102 and the RE 104 according to the previous values of the fair share throughputs. If the fairness index for the ones of the AP 102 and the RE 104 has increased, the fair share throughput comparator 204 determines that the fair share throughput of one or more of the RE 104, the STA 106, the STA 108, the STA 110, or the STA 112 has improved. If the fairness index for the ones of the AP 102 and the RE 104 has decreased, the fair share throughput comparator 204 determines that the fair share throughput of one or more of the RE 104, the STA 106, the STA 108, the STA 110, or the STA 112 has not improved. If the fair share throughput comparator 204 determines that the fair share throughput of one or more of the RE 104, the STA 106, the STA 108, the STA 110, or the STA 112 has improved (block 418: YES) the program 400 proceeds to block 406. If the fair share throughput comparator 204 does not determine that the fair share throughput of one or more of the RE 104, the STA 106, the STA 108, the STA 110, or the STA 112 has improved (block 418: NO) the program 400 proceeds to block 420. At block 420, the fair share throughput comparator 204 updates the demands of one or more of the RE 104, the STA 106, the STA 108, the STA 110, or the STA 112.

At block 422, the fair share throughput comparator 204 determines whether to continue operating the bandwidth analyzer 118. Examples of situations that may cause the fair share throughput comparator 204 to determine to stop operating (block 422: NO) include loss of power, optimization of the RE 104, the STA 106, the STA 108, the STA 110, and the STA 112, etc. If the fair share throughput comparator 204 determines to continue operating the bandwidth analyzer 118 (block 422: YES), the program 400 proceeds to block 424. At block 424, the fair share throughput comparator 204 monitors the dataflows of the RE 104, the STA 106, the STA 108, the STA 110, and the STA 112 at a time interval. In some examples, the time interval is a periodic time interval. In other examples, the time interval is intermittent and based on a condition of the AP 102 or the RE 104. If the fair share throughput comparator 204 determines not to continue operating the bandwidth analyzer 118 (block 422: NO), the program 400 ends.

Figure 5:
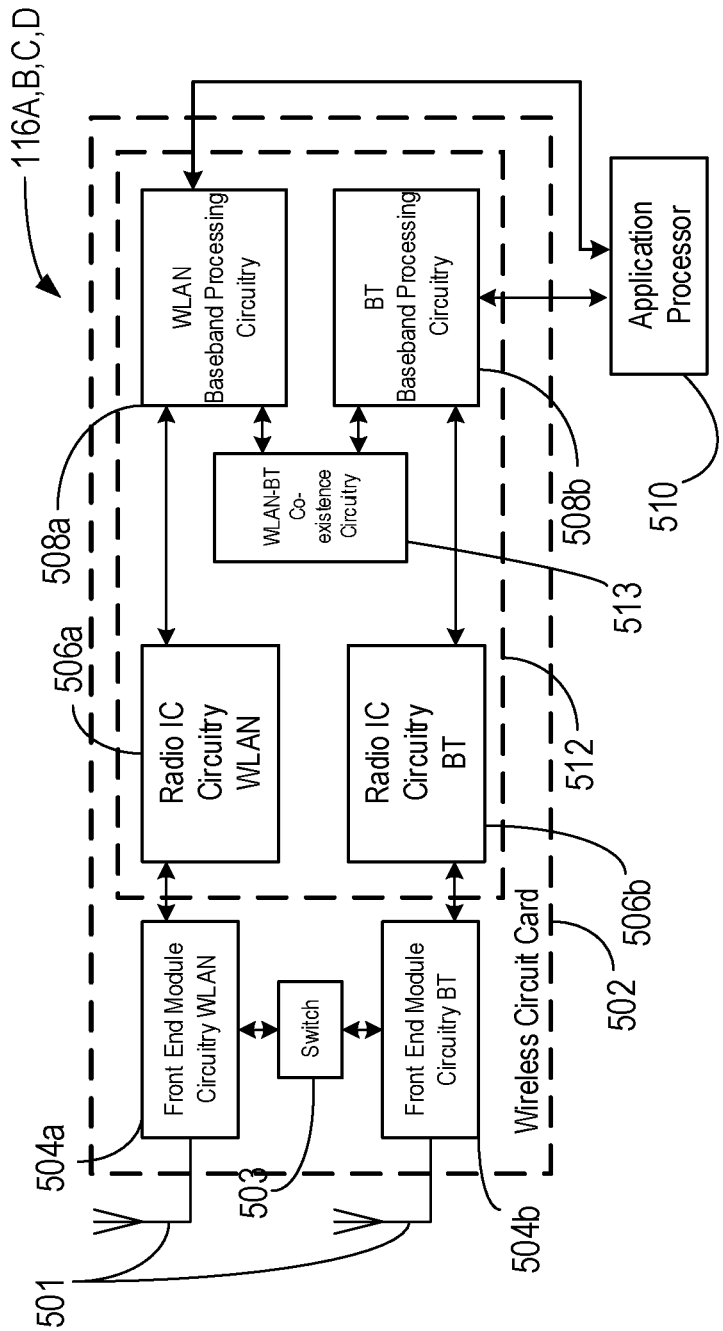
FIG. 5 is a block diagram of a radio architecture in accordance with some examples.

FIG. 5 is a block diagram of a radio architecture 116 A,B,C,D in accordance with some embodiments that may be implemented in any one of the example AP 102 and/or the example RE 104 and/or the example STAs 106, 108, 110, 112 of FIG. 1. Radio architecture 116 A,B,C,D may include radio front-end module (FEM) circuitry 504*a-b*, radio IC circuitry 506*a-b* and baseband processing circuitry 508*a-b*. Radio architecture 116 A,B,C,D as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 504*a-b* may include a WLAN or Wi-Fi FEM circuitry 504*a* and a Bluetooth (BT) FEM circuitry 504*b*. The WLAN FEM circuitry 504*a* may include a receive signal path comprising circuitry configured to operate on WLAN RF signals received from one or more antennas 501, to amplify the received signals and to provide the amplified versions of the received signals to the WLAN radio IC circuitry 506*a* for further processing. The BT FEM circuitry 504*b* may include a receive signal path which may include circuitry configured to operate on BT RF signals received from one or more antennas 501, to amplify the received signals and to provide the amplified versions of the received signals to the BT radio IC circuitry 506*b* for further processing. FEM circuitry 504*a* may also include a transmit signal path which may include circuitry configured to amplify WLAN signals provided by the radio IC circuitry 1106*a* for wireless transmission by one or more of the antennas 501. In addition, FEM circuitry 504*b* may also include a transmit signal path which may include circuitry configured to amplify BT signals provided by the radio IC circuitry 506*b* for wireless transmission by the one or more antennas. In the embodiment of FIG. 5, although FEM 504*a* and FEM 504*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 506*a-b* as shown may include WLAN radio IC circuitry 506*a* and BT radio IC circuitry 506*b*. The WLAN radio IC circuitry 506*a* may include a receive signal path which may include circuitry to down-convert WLAN RF signals received from the FEM circuitry 504*a* and provide baseband signals to WLAN baseband processing circuitry 508*a*. BT radio IC circuitry 506*b* may in turn include a receive signal path which may include circuitry to down-convert BT RF signals received from the FEM circuitry 504*b* and provide baseband signals to BT baseband processing circuitry 508*b*. WLAN radio IC circuitry 506*a* may also include a transmit signal path which may include circuitry to up-convert WLAN baseband signals provided by the WLAN baseband processing circuitry 508*a* and provide WLAN RF output signals to the FEM circuitry 504*a* for subsequent wireless transmission by the one or more antennas 501. BT radio IC circuitry 506*b* may also include a transmit signal path which may include circuitry to up-convert BT baseband signals provided by the BT baseband processing circuitry 508*b* and provide BT RF output signals to the FEM circuitry 504*b* for subsequent wireless transmission by the one or more antennas 501. In the embodiment of FIG. 5, although radio IC circuitries 506*a* and 506*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 508*a*-*b* may include a WLAN baseband processing circuitry 508*a* and a BT baseband processing circuitry 508*b*. The WLAN baseband processing circuitry 508*a* may include a memory, such as, for example, a set of RAM arrays in a Fast Fourier Transform or Inverse Fast Fourier Transform block (not shown) of the WLAN baseband processing circuitry 508*a*. Each of the WLAN baseband circuitry 508*a* and the BT baseband circuitry 508*b* may further include one or more processors and control logic to process the signals received from the corresponding WLAN or BT receive signal path of the radio IC circuitry 506*a*-*b*, and to also generate corresponding WLAN or BT baseband signals for the transmit signal path of the radio IC circuitry 506*a*-*b*. Each of the baseband processing circuitries 508*a* and 508*b* may further include physical layer (PHY) and medium access control layer (MAC) circuitry for generation and processing of the baseband signals and for controlling operations of the radio IC circuitry 506*a*-*b*.

Referring still to FIG. 5, according to the shown embodiment, WLAN-BT coexistence circuitry 513 may include logic providing an interface between the WLAN baseband circuitry 508*a* and the BT baseband circuitry 508*b* to enable use cases requiring WLAN and BT coexistence. In addition, a switch 503 may be provided between the WLAN FEM circuitry 504*a* and the BT FEM circuitry 504*b* to allow switching between the WLAN and BT radios according to application needs. In addition, although the antennas 501 are depicted as being respectively connected to the WLAN FEM circuitry 504*a* and the BT FEM circuitry 504*b*, embodiments include within their scope the sharing of one or more antennas as between the WLAN and BT FEMs, or the provision of more than one antenna connected to each of FEM 504*a* or 504*b*.

In some embodiments, the front-end module circuitry 504*a*-*b*, the radio IC circuitry 506*a*-*b*, and baseband processing circuitry 508*a*-*b* may be provided on a single radio card, such as wireless radio card 502. In some other embodiments, the one or more antennas 501, the FEM circuitry 504*a*-*b* and the radio IC circuitry 506*a*-*b* may be provided on a single radio card. In some other embodiments, the radio IC circuitry 506*a*-*b* and the baseband processing circuitry 508*a*-*b* may be provided on a single chip or integrated circuit (IC), such as IC 512.

In some embodiments, the wireless radio card 502 may include a WLAN radio card and may be configured for Wi-Fi communications, although the scope of the embodiments is not limited in this respect. In some of these embodiments, the radio architecture 116 A,B,C,D may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 116 A,B,C,D may be part of a Wi-Fi communication station (STA) such as a wireless access point (AP), a base station or a mobile device including a Wi-Fi device. In some of these embodiments, radio architecture 116 A,B,C,D may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 116 A,B,C,D may also be suitable to transmit and/or receive communications in accordance with other techniques and standards.

In some embodiments, the radio architecture 116 A,B,C,D may be configured for high-efficiency Wi-Fi (HEW) communications in accordance with the IEEE 802.11ax standard. In these embodiments, the radio architecture 116 A,B,C,D may be configured to communicate in accordance with an OFDMA technique, although the scope of the embodiments is not limited in this respect.

In some other embodiments, the radio architecture 116 A,B,C,D may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 8:
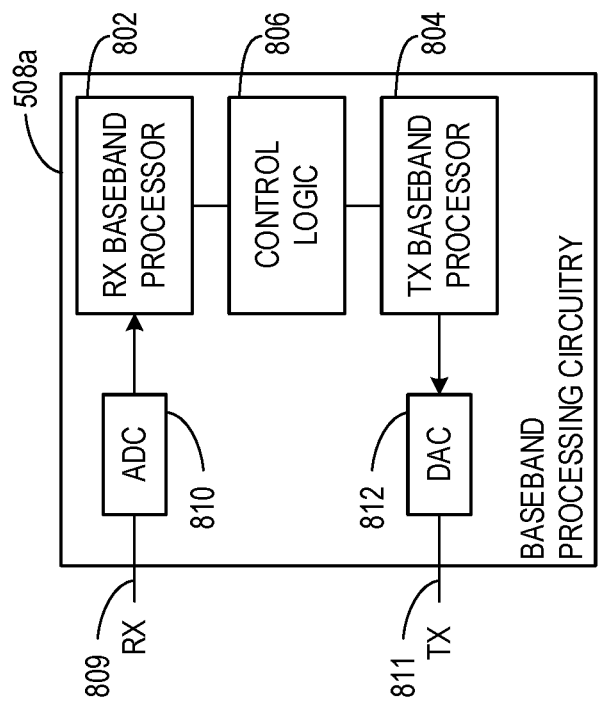
FIG. 8 illustrates an example baseband processing circuitry for use in the radio architecture of FIG. 5 in accordance with some examples.

In some embodiments, as further shown in FIG. 8, the BT baseband circuitry 508*b* may be compliant with a Bluetooth (BT) connectivity standard such as Bluetooth, Bluetooth 14.0 or Bluetooth 12.0, or any other iteration of the Bluetooth Standard. In embodiments that include BT functionality as shown for example in FIG. 5, the radio architecture 116 A,B,C,D may be configured to establish a BT synchronous connection oriented (SCO) link and or a BT low energy (BT LE) link. In some of the embodiments that include functionality, the radio architecture 116 A,B,C,D may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 5, the functions of a BT radio card and WLAN radio card may be combined on a single wireless radio card, such as single wireless radio card 502, although embodiments are not so limited, and include within their scope discrete WLAN and BT radio cards In some embodiments, the radio architecture 116 A,B,C,D may include other radio cards, such as a cellular radio card configured for cellular (e.g., 3GPP such as LTE, LTE-Advanced or 5G communications).

In some IEEE 802.11 embodiments, the radio architecture 116 A,B,C,D may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6

MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 6:
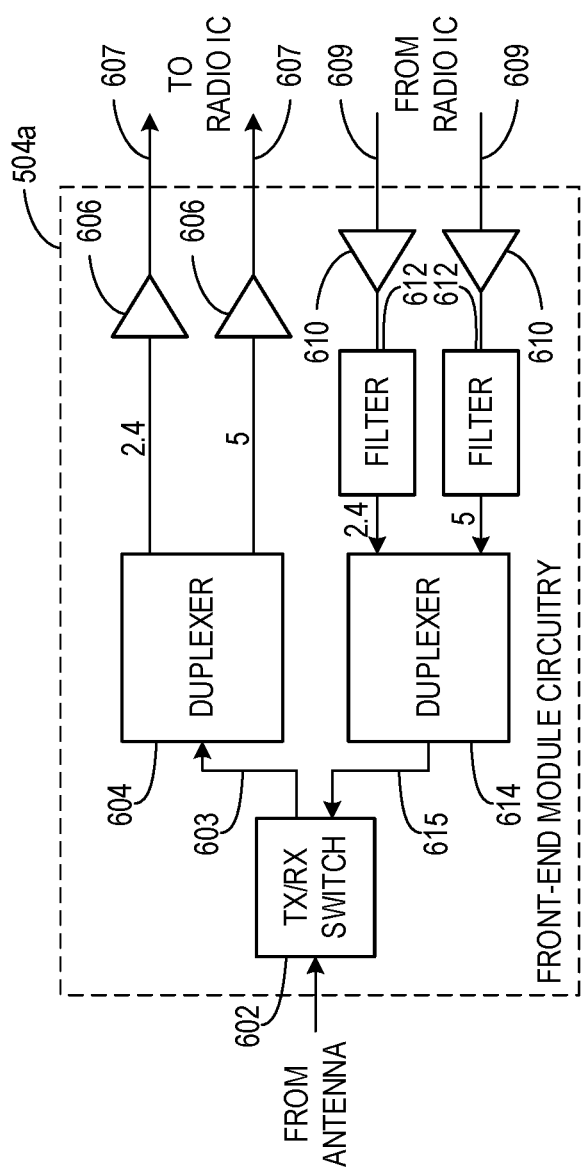
FIG. 6 illustrates an example front-end module circuitry for use in the radio architecture of FIG. 5 in accordance with some examples.

FIG. 6 illustrates WLAN FEM circuitry 504a in accordance with some embodiments. Although the example of FIG. 6 is described in conjunction with the WLAN FEM circuitry 504a, the example of FIG. 6 may be described in conjunction with the example BT FEM circuitry 504b (FIG. 5), although other circuitry configurations may also be suitable.

In some embodiments, the FEM circuitry 504a may include a TX/RX switch 602 to switch between transmit mode and receive mode operation. The FEM circuitry 504a may include a receive signal path and a transmit signal path. The receive signal path of the FEM circuitry 504a may include a low-noise amplifier (LNA) 606 to amplify received RF signals 603 and provide the amplified received RF signals 607 as an output (e.g., to the radio IC circuitry 506a-b (FIG. 5)). The transmit signal path of the circuitry 504a may include a power amplifier (PA) to amplify input RF signals 609 (e.g., provided by the radio IC circuitry 506a-b), and one or more filters 512, such as band-pass filters (BPFs), low-pass filters (LPFs) or other types of filters, to generate RF signals 515 for subsequent transmission (e.g., by one or more of the antennas 501 (FIG. 5)) via an example duplexer 514.

In some dual-mode embodiments for Wi-Fi communication, the FEM circuitry 504a may be configured to operate in either the 2.4 GHz frequency spectrum or the 12 GHz frequency spectrum. In these embodiments, the receive signal path of the FEM circuitry 504a may include a receive signal path duplexer 604 to separate the signals from each spectrum as well as provide a separate LNA 606 for each spectrum as shown. In these embodiments, the transmit signal path of the FEM circuitry 504a may also include a power amplifier 610 and a filter 612, such as a BPF, an LPF or another type of filter for each frequency spectrum and a transmit signal path duplexer 604 to provide the signals of one of the different spectrums onto a single transmit path for subsequent transmission by the one or more of the antennas 501 (FIG. 5). In some embodiments, BT communications may utilize the 2.4 GHz signal paths and may utilize the same FEM circuitry 504a as the one used for WLAN communications.

Figure 7:
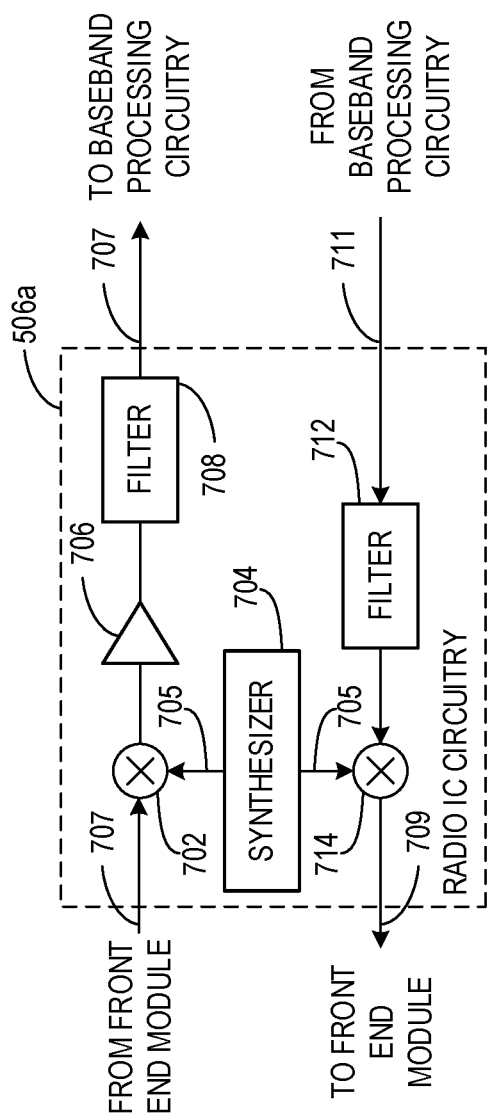
FIG. 7 illustrates an example radio IC circuitry for use in the radio architecture of FIG. 5 in accordance with some examples.

FIG. 7 illustrates radio IC circuitry 506a in accordance with some embodiments. The radio IC circuitry 506a is one example of circuitry that may be suitable for use as the WLAN or BT radio IC circuitry 506a/506b (FIG. 5), although other circuitry configurations may also be suitable. Alternatively, the example of FIG. 7 may be described in conjunction with the example BT radio IC circuitry 506b.

In some embodiments, the radio IC circuitry 506a may include a receive signal path and a transmit signal path. The receive signal path of the radio IC circuitry 506a may include at least mixer circuitry 702, such as, for example, down-conversion mixer circuitry, amplifier circuitry 706 and filter circuitry 708. The transmit signal path of the radio IC circuitry 506a may include at least filter circuitry 712 and mixer circuitry 714, such as, for example, up-conversion mixer circuitry. Radio IC circuitry 506a may also include synthesizer circuitry 704 for synthesizing a frequency 705 for use by the mixer circuitry 702 and the mixer circuitry 714. The mixer circuitry 702 and/or 714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 7 illustrates only a simplified version of a radio IC circuitry, and may include, although not shown, embodiments where each of the depicted circuitries may include more than one component. For instance, mixer circuitry 714 may each include one or more mixers, and filter circuitries 708 and/or 712 may each include one or more filters, such as one or more BPFs and/or LPFs according to application needs. For example, when mixer circuitries are of the direct-conversion type, they may each include two or more mixers.

In some embodiments, mixer circuitry 702 may be configured to down-convert RF signals 607 received from the FEM circuitry 504a-b (FIG. 5) based on the synthesized frequency 705 provided by synthesizer circuitry 704. The amplifier circuitry 706 may be configured to amplify the down-converted signals and the filter circuitry 708 may include an LPF configured to remove unwanted signals from the down-converted signals to generate output baseband signals 707. Output baseband signals 707 may be provided to the baseband processing circuitry 508a-b (FIG. 5) for further processing. In some embodiments, the output baseband signals 707 may be zero-frequency baseband signals, although this is not a requirement. In some embodiments, mixer circuitry 702 may comprise passive mixers, although the scope of the embodiments is not limited in this respect.

In some embodiments, the mixer circuitry 714 may be configured to up-convert input baseband signals 711 based on the synthesized frequency 705 provided by the synthesizer circuitry 704 to generate RF output signals 609 for the FEM circuitry 504a-b. The baseband signals 611 may be provided by the baseband processing circuitry 508a-b and may be filtered by filter circuitry 712. The filter circuitry 712 may include an LPF or a BPF, although the scope of the embodiments is not limited in this respect.

In some embodiments, the mixer circuitry 702 and the mixer circuitry 714 may each include two or more mixers and may be arranged for quadrature down-conversion and/or up-conversion respectively with the help of synthesizer 704. In some embodiments, the mixer circuitry 702 and the mixer circuitry 714 may each include two or more mixers each configured for image rejection (e.g., Hartley image rejection). In some embodiments, the mixer circuitry 702 and the mixer circuitry 714 may be arranged for direct down-conversion and/or direct up-conversion, respectively. In some embodiments, the mixer circuitry 702 and the mixer circuitry 714 may be configured for super-heterodyne operation, although this is not a requirement.

Mixer circuitry 702 may comprise, according to one embodiment: quadrature passive mixers (e.g., for the in-phase (I) and quadrature phase (Q) paths). In such an embodiment, RF input signal 607 from FIG. 6 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 705 of synthesizer 704 (FIG. 7). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 607 (FIG. 6) may comprise a balanced signal, although the scope of the embodiments is not limited in this respect. The I and Q baseband output signals may be provided to low-noise amplifier, such as amplifier circuitry 706 (FIG. 7) or to filter circuitry 708 (FIG. 7).

In some embodiments, the output baseband signals 707 and the input baseband signals 711 may be analog baseband signals, although the scope of the embodiments is not limited in this respect. In some alternate embodiments, the output baseband signals 707 and the input baseband signals 711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 704 may be a fractional-N synthesizer or a fractional N/N+1 synthesizer, although the scope of the embodiments is not limited in this respect as other types of frequency synthesizers may be suitable. For example, synthesizer circuitry 704 may be a delta-sigma synthesizer, a frequency multiplier, or a synthesizer comprising a phase-locked loop with a frequency divider. According to some embodiments, the synthesizer circuitry 704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 704 may be provided by a voltage controlled oscillator (VCO), although that is not a requirement. A divider control input may further be provided by either the baseband processing circuitry 508a-b (FIG. 5) depending on the desired output frequency 705. In some embodiments, a divider control input (e.g., N) may be determined from a look-up table (e.g., within a Wi-Fi card) based on a channel number and a channel center frequency as determined or indicated by the example application processor 510.

In some embodiments, synthesizer circuitry 704 may be configured to generate a carrier frequency as the output frequency 705, while in other embodiments, the output frequency 705 may be a fraction of the carrier frequency (e.g., one-half the carrier frequency, one-third the carrier frequency). In some embodiments, the output frequency 705 may be a LO frequency (fLO).

FIG. 8 illustrates a functional block diagram of baseband processing circuitry 508a in accordance with some embodiments. The baseband processing circuitry 508a is one example of circuitry that may be suitable for use as the baseband processing circuitry 508a (FIG. 5), although other circuitry configurations may also be suitable. Alternatively, the example of FIG. 8 may be used to implement the example BT baseband processing circuitry 508b of FIG. 5.

The baseband processing circuitry 508a may include a receive baseband processor (RX BBP) 802 for processing receive baseband signals 709 provided by the radio IC circuitry 506a-b (FIG. 5) and a transmit baseband processor (TX BBP) 804 for generating transmit baseband signals 611 for the radio IC circuitry 506a-b. The baseband processing circuitry 508a may also include control logic 806 for coordinating the operations of the baseband processing circuitry 508a.

In some embodiments (e.g., when analog baseband signals are exchanged between the baseband processing circuitry 508a-b and the radio IC circuitry 506a-b), the baseband processing circuitry 508a may include ADC 810 to convert analog baseband signals 809 received from the radio IC circuitry 506a-b to digital baseband signals for processing by the RX BBP 802. In these embodiments, the baseband processing circuitry 508a may also include DAC 812 to convert digital baseband signals from the TX BBP 804 to analog baseband signals 811.

In some embodiments that communicate OFDM signals or OFDMA signals, such as through baseband processor 508a, the transmit baseband processor 804 may be configured to generate OFDM or OFDMA signals as appropriate for transmission by performing an inverse fast Fourier transform (IFFT). The receive baseband processor 802 may be configured to process received OFDM signals or OFDMA signals by performing an FFT. In some embodiments, the receive baseband processor 802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 5, in some embodiments, the antennas 501 (FIG. 5) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 501 may each include a set of phased-array antennas, although embodiments are not so limited.

Although the radio architecture 116 A,B,C,D is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 9:
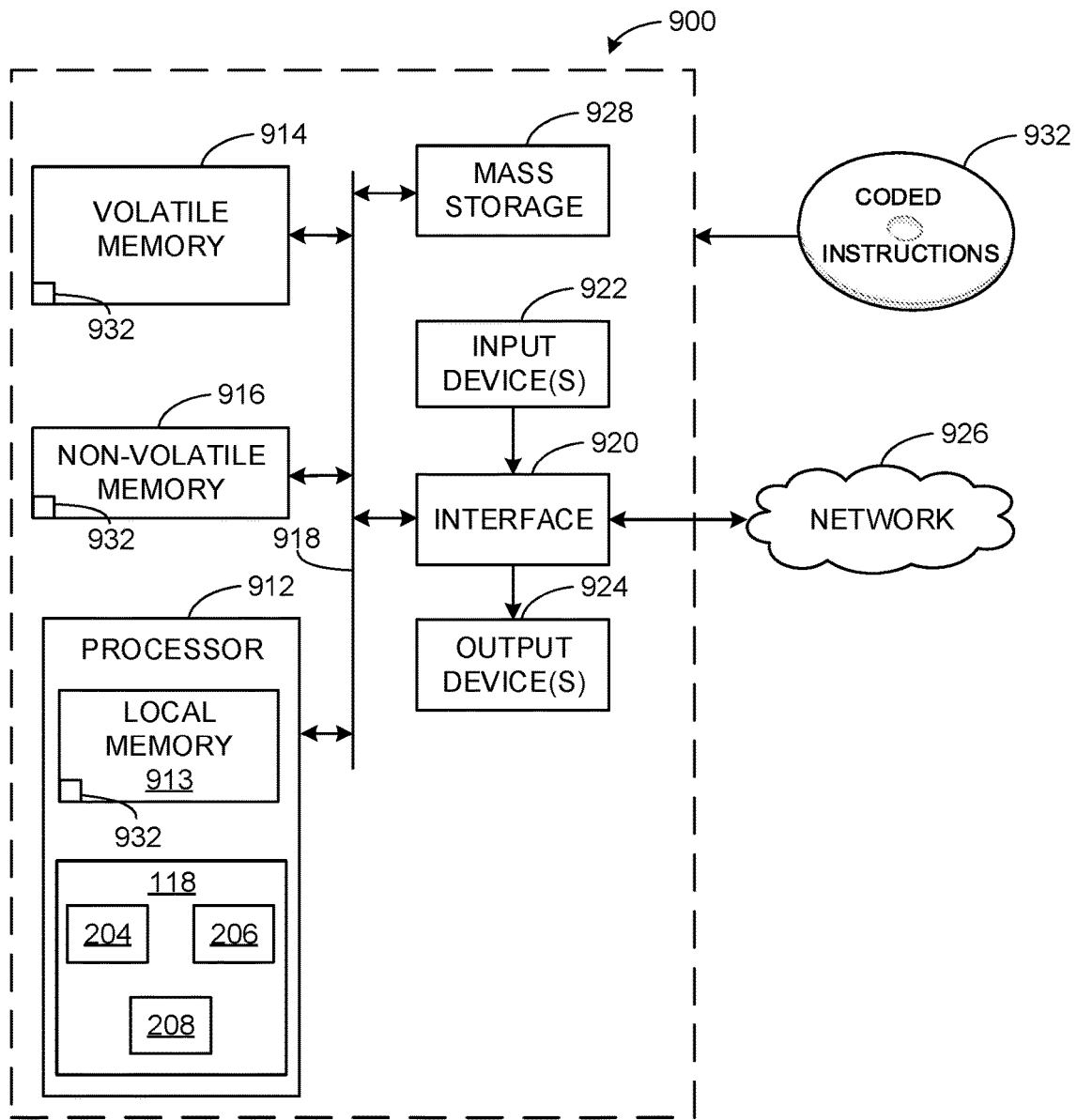
FIG. 9 is a block diagram of a processor platform structured to execute the example machine readable instructions of FIG. 4 to implement the any one of, or any combination of, the range extender and/or the access point of FIG. 1.

FIG. 9 is a block diagram of an example processor platform 1000 structured to execute the instructions of FIG. 4 to implement the bandwidth analyzer 118 of FIG. 2 The processor platform 900 can be, for example, a server, a personal computer, a workstation, a self-learning machine (e.g., utilizing a reinforcement learning algorithm), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the fair share throughput comparator 204, the weight adjustor 206, the fair share throughput storage 208, and more generally the bandwidth analyzer 118

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 4 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that allow an access point with hardware limitations on the number of available queues to provide stations and/or other access points (e.g., range extenders) with a network to effectively optimize the fair share throughput to the different stations and/or access points in communication with the access point with hardware limitations. Examples disclosed herein allow an access point to iteratively change the weights associated with the fair share throughputs of the different stations and/or access points in communication with an access point such that the fairness of each different stations and/or access points in communication with the access point converges on an optimal fairness value. The disclosed methods, apparatus and articles of manufacture improve the efficiency of using a computing device by increasing the number of stations that an access point can effectively provide a network to. Examples disclosed herein allow an access point with hardware limitations limiting the access point to four queues with which to supply different STAs with a network to optimize the network supplied to more than four STAs when using satellite access points (e.g., range extenders) to extend the network. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to allocate bandwidth between devices, the apparatus comprising:
   a comparator circuit to determine whether a first dataflow to a first device is below a first fair share throughput attributed to the first device; and
   a weight adjustor circuit to, in response to the comparator circuit determining that the first dataflow is below the first fair share throughput attributed to the first device:
   adjust the first fair share throughput such that the first dataflow is closer to the first fair share throughput;
   calculate a first fairness for the first device and a second fairness for a second device;
   select the first device when the first fairness is lower than the second fairness;
   determine a first weight for the first fair share throughput to increase the first fairness; and
   adjust a second fair share throughput attributed to the second device such that a second dataflow to the second device is closer to the second fair share throughput.

2. The apparatus of claim 1, wherein the first device is a station device and the second device is an access point device.

3. The apparatus of claim 1, wherein the comparator circuit is to:

set the first fair share throughput of the first device and the second fair share throughput of the second device; and determine the first dataflow to the first device based on a number of data packets sent to the first device over a period of time and a size of each of the number of data packets.

4. The apparatus of claim 1, wherein to adjust the second fair share throughput the weight adjustor circuit is to determine a second weight for the second fair share throughput based on an availability of fair share throughput, the availability of fair share throughput based on the first fairness.

5. The apparatus of claim 4, wherein the weight adjustor circuit is to use machine learning algorithms to determine the first weight and the second weight.

6. The apparatus of claim 1, wherein in response to the weight adjustor circuit adjusting the first fair share throughput and adjusting the second fair share throughput, the comparator circuit is to:

determine whether one or more of the first dataflow is closer to the first fair share throughput and the second dataflow is closer to the second fair share throughput, based on a fairness index associated with the first device and the second device; and in response to determining that both the first dataflow and the second dataflow is at or below the first fair share throughput or the second fair share throughput, monitor the first device and the second device for a change in the first dataflow or the second dataflow, respectively.

7. A non-transitory computer readable storage medium to allocate bandwidth between devices, the non-transitory computer readable storage medium comprising instructions that, when executed, cause a machine to at least:

determine whether a first dataflow to a first device is below a first fair share throughput attributed to the first device;

in response to determining that the first dataflow is below the first fair share throughput attributed to the first device:

adjust the first fair share throughput such that the first dataflow is closer to the first fair share throughput;

calculate a first fairness for the first device and a second fairness for a second device;

select the first device when the first fairness is lower than the second fairness;

determine a first weight for the first fair share throughput to increase the first fairness; and adjust a second fair share throughput attributed to the second device such that a second dataflow to the second device is closer to the second fair share throughput.

8. The non-transitory computer readable storage medium of claim 7, wherein the first device is a station device and the second device is an access point device.

9. The non-transitory computer readable storage medium of claim 7, wherein the instructions that, when executed, cause the machine to:

set the first fair share throughput of the first device and the second fair share throughput of the second device; and determine the first dataflow to the first device based on a number of data packets sent to the first device over a period of time and a size of each of the number of data packets.

10. The non-transitory computer readable storage medium of claim 7, wherein the instructions that, when executed, cause the machine to adjust the second fair share throughput cause the machine to determine a second weight for the second fair share throughput based on an availability of fair share throughput, the availability of fair share throughput based on the first fairness.

11. The non-transitory computer readable storage medium of claim 10, wherein the instructions, that when executed, cause the machine to use machine learning algorithms to determine the first weight and the second weight.

12. The non-transitory computer readable storage medium of claim 7, wherein in response to adjusting the first fair share throughput and adjusting the second fair share throughput, the instructions that, when executed, cause the machine to:

determine whether one or more of the first dataflow is closer to the first fair share throughput and the second dataflow is closer to the second fair share throughput, based on a fairness index associated with the first device and the second device; and in response to determining that both the first dataflow and the second dataflow is at or below the first fair share throughput or the second fair share throughput, monitor the first device and the second device for a change in the first dataflow or the second dataflow, respectively.

13. A method to allocate bandwidth between devices, the method comprising:

determining whether a first dataflow to a first device is below a first fair share throughput attributed to the first device;

in response to determining that the first dataflow is below the first fair share throughput attributed to the first device:

adjusting the first fair share throughput such that the first dataflow is closer to the first fair share throughput;

calculating a first fairness for the first device and a second fairness for a second device;

selecting the first device when the first fairness is lower than the second fairness;

determining a first weight for the first fair share throughput to increase the first fairness; and adjusting a second fair share throughput attributed to the second device such that a second dataflow to the second device is closer to the second fair share throughput.

14. The method of claim 13, wherein the first device is a station device and the second device is an access point device.

15. The method of claim 14 further including, setting the first fair share throughput of the first device and the second fair share throughput of the second device; and determining the first dataflow to the first device based on a number of data packets sent to the first device over a period of time and a size of each of the number of data packets.

16. The method of claim 13, wherein adjusting the second fair share throughput includes determining a second weight for the second fair share throughput based on an availability of fair share throughput, the availability of fair share throughput based on the first fairness.

17. The method of claim 13, further including in response to adjusting the first fair share throughput and adjusting the second fair share throughput:

determining whether one or more of the first dataflow is closer to the first fair share throughput and the second dataflow is closer to the second fair share throughput, based on a fairness index associated with the first device and the second device; and in response to determining that both the first dataflow and the second dataflow is at or below the first fair share throughput or the second fair share throughput, monitoring the first device and the second device for a change in the first dataflow or the second dataflow, respectively.

18. An apparatus to allocate bandwidth between devices, the apparatus comprising:
a comparator circuit to determine whether a first dataflow to a first device is below a first fair share throughput attributed to the first device; and
a weight adjustor circuit to, in response to the comparator circuit determining that the first dataflow is below the first fair share throughput attributed to the first device:
adjust the first fair share throughput such that the first dataflow is closer to the first fair share throughput; and
adjust a second fair share throughput attributed to a second device such that a second dataflow to the second device is closer to the second fair share throughput; and
wherein, in response to the weight adjustor circuit adjusting the first fair share throughput and adjusting the second fair share throughput, the comparator circuit is to:
determine whether one or more of the first dataflow is closer to the first fair share throughput and the second dataflow is closer to the second fair share throughput, based on a fairness index associated with the first device and the second device; and
in response to determining that both the first dataflow and the second dataflow is at or below the first fair share throughput or the second fair share throughput, monitor the first device and the second device for a change in the first dataflow or the second dataflow, respectively.

19. A non-transitory computer readable storage medium to allocate bandwidth between devices, the non-transitory computer readable storage medium comprising instructions that, when executed, cause a machine to at least:
determine whether a first dataflow to a first device is below a first fair share throughput attributed to the first device;
in response to determining that the first dataflow is below the first fair share throughput attributed to the first device:
adjust the first fair share throughput such that the first dataflow is closer to the first fair share throughput; and
adjust a second fair share throughput attributed to a second device such that a second dataflow to the second device is closer to the second fair share throughput; and
in response to adjusting the first fair share throughput and adjusting the second fair share throughput:
determine whether one or more of the first dataflow is closer to the first fair share throughput and the second dataflow is closer to the second fair share throughput, based on a fairness index associated with the first device and the second device; and
in response to determining that both the first dataflow and the second dataflow is at or below the first fair share throughput or the second fair share throughput, monitor the first device and the second device for a change in the first dataflow or the second dataflow, respectively.

20. A method to allocate bandwidth between devices, the method comprising:
determining whether a first dataflow to a first device is below a first fair share throughput attributed to the first device;
in response to determining that the first dataflow is below the first fair share throughput attributed to the first device:
adjusting the first fair share throughput such that the first dataflow is closer to the first fair share throughput; and
adjusting a second fair share throughput attributed to a second device such that a second dataflow to the second device is closer to the second fair share throughput; and
in response to adjusting the first fair share throughput and adjusting the second fair share throughput:
determining whether one or more of the first dataflow is closer to the first fair share throughput and the second dataflow is closer to the second fair share throughput, based on a fairness index associated with the first device and the second device; and
in response to determining that both the first dataflow and the second dataflow is at or below the first fair share throughput or the second fair share throughput, monitoring the first device and the second device for a change in the first dataflow or the second dataflow, respectively.

* * * * *